(12) United States Patent
Zeineddine et al.

(10) Patent No.: US 12,495,420 B2
(45) Date of Patent: Dec. 9, 2025

(54) METHOD AND APPARATUS FOR PROVIDING CHANNEL ESTIMATION FOR SINGLE FREQUENCY NETWORK TRANSMISSIONS IN HIGH SPEED TRANSIT SCENARIOS

(71) Applicant: Lenovo (Singapore) Pte. Ltd., New Tech Park (SG)

(72) Inventors: Khalid Zeineddine, Evanston, IL (US); Ahmed Hindy, Forest Park, IL (US); Udar Mittal, Rolling Meadows, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 436 days.

(21) Appl. No.: 17/923,225

(22) PCT Filed: May 6, 2021

(86) PCT No.: PCT/IB2021/053869
§ 371 (c)(1),
(2) Date: Nov. 3, 2022

(87) PCT Pub. No.: WO2021/224868
PCT Pub. Date: Nov. 11, 2021

(65) Prior Publication Data
US 2023/0189262 A1     Jun. 15, 2023

Related U.S. Application Data

(60) Provisional application No. 63/021,053, filed on May 6, 2020.

(51) Int. Cl.
*H04W 72/04*       (2023.01)
*H04L 5/00*        (2006.01)
(Continued)

(52) U.S. Cl.
CPC ....... *H04W 72/1273* (2013.01); *H04L 5/0048* (2013.01); *H04W 72/232* (2023.01)

(58) Field of Classification Search
None
See application file for complete search history.

(56) References Cited

U.S. PATENT DOCUMENTS

| | | | |
|---|---|---|---|
| 2014/0112290 A1* | 4/2014 | Chun | H04L 5/00 370/329 |
| 2020/0100277 A1 | 3/2020 | Khoshnevisan et al. | |

(Continued)

OTHER PUBLICATIONS

PCT International Search Report for PCT/IB2021/053869, Lenovo (Singapore) Pte. Ltd., mailing date—Aug. 23, 2021.

(Continued)

*Primary Examiner* — Maharishi V Khirodhar
(74) *Attorney, Agent, or Firm* — FIG. 1 Patents

(57) ABSTRACT

A method and apparatus are provided, in which a higher layer configuration is received (2002), where the user equipment is configured with two timing reference signals for receiving a common communication having a same set of data from multiple signal sources. A downlink scheduling assignment including downlink control information is received (2004) in a control channel scheduling a physical downlink shared channel, wherein the downlink scheduling assignment comprises an indication of a transmission configuration indicator identifying two transmission configuration indicator states, which each indicate quasi-co-location information of a demodulation reference signal corresponding to the physical downlink shared channel relative to a respective one of the first and the second timing reference (Continued)

signals. The physical downlink shared channel is then received (2006) according to the downlink scheduling assignment including the downlink control information.

20 Claims, 18 Drawing Sheets

(51) Int. Cl.
*H04W 72/1273* (2023.01)
*H04W 72/232* (2023.01)
*H04W 76/00* (2018.01)
*H04W 88/08* (2009.01)

(56) References Cited

U.S. PATENT DOCUMENTS

| | | | | |
|---|---|---|---|---|
| 2020/0328849 | A1* | 10/2020 | Noh | H04L 1/1812 |
| 2021/0337572 | A1* | 10/2021 | Ji | H04W 72/0446 |
| 2023/0131134 | A1* | 4/2023 | Mei | H04L 5/0051 |
| | | | | 370/329 |
| 2023/0156742 | A1* | 5/2023 | Zheng | H04L 5/0051 |
| | | | | 370/329 |
| 2023/0344575 | A1* | 10/2023 | Manolakos | H04L 25/0228 |

OTHER PUBLICATIONS

3GPP TS 38.214 V16.1.0 (Mar. 2020), 3rd Generation Partnership Project; Technical Specification Group Radio Access Network; NR; Physical layer procedures for data (Release 16).
3GPP TS 38.331 V16.0.0 (Mar. 2020), 3rd Generation Partnership Project; Technical Specification Group Radio Access Network; NR; Radio Resource Control (RRC) protocol specification (Release 16).
Huawei et al., "Summary of AI: 7.2.8.2 Enhancements on Multi-TRP/Panel Transmission of Offline Discussion", R1-1907706, for 3GPP TSG-RAN WG1 Meeting #97, Reno, USA, May 13-17, 2019.
Qualcomm Inc., "Multi-TRP Enhancements", R1-1911126, for 3GPP TSG-RAN WG1 Meeting #98bis, Chongqing, China, Oct. 14-20, 2019.
Ericsson, "Transmission scheme in Nr Pdsch demodulation requirements for HST", R4-2001357, for 3GPP TSG-RAN WG4 Meeting #94-e, Electronic Meeting, Mar. 24-6, 2020.

* cited by examiner

```
TCI-State ::=       SEQUENCE {
    tci-StateId         TCI-StateId,
    qcl-Type1           QCL-Info,
    qcl-Type2           QCL-Info                OPTIONAL,   -- Need R
    ...
}

QCL-Info ::=        SEQUENCE {
    cell                servCellIndex           OPTIONAL,   -- Need R
    bwp-Id              BWPId                   OPTIONAL,   -- Cond CSI-RS-Indicated
    referenceSignal     CHOICE {
        csi-rs              NZP-CSI-RS ResourceID,
        ssb                 SSB-Index
    },
    qcl-Type            ENUMERATED {typeA, typeB, typeC, typeD},
    ...
}
```

FIG. 6

```
-- ASN1START
-- TAG-PDSCH-CONFIG-START

PDSCH-Config ::=         SEQUENCE {
    dataScramblingIdentityPDSCH         INTEGER (0..1023)                              OPTIONAL,  -- Need S
    dmrs-DownlinkForPDSCH-MappingTypeA  SetupRelease { DMRS-DownlinkConfig }           OPTIONAL,  -- Need M
    dmrs-DownlinkForPDSCH-MappingTypeB  SetupRelease { DMRS-DownlinkConfig }           OPTIONAL,  -- Need M
    ...
}
```

```
-- ASN1START
-- TAG-DMRS-DOWNLINKCONFIG-START

DMRS-DownlinkConfig ::=  SEQUENCE {
    dmrs-Type                 ENUMERATED {type2}                                        OPTIONAL,  -- Need S
    dmrs-AdditionalPosition   ENUMERATED {pos0, pos1, pos3}                             OPTIONAL,  -- Need S
    maxLength                 ENUMERATED {len2}                                         OPTIONAL,  -- Need S
    scramblingID0             INTEGER (0..65535)                                        OPTIONAL,  -- Need S
    scramblingID1             INTEGER (0..65535)                                        OPTIONAL,  -- Need S
    phaseTrackingRS           SetupRelease { PTRS-DownlinkConfig }                      OPTIONAL,  -- Need M
    ...,
    [[
    dmrs-Downlink-r16         ENUMERATED {enabled}                                      OPTIONAL   -- Need R
    ]]
}

-- TAG-DMRS-DOWNLINKCONFIG-STOP
-- ASN1STOP
```

Mapping Type A, $l_0 = 2$

AdditionalPosition = 2    AdditionalPosition = 3

METHOD AND APPARATUS FOR PROVIDING CHANNEL ESTIMATION FOR SINGLE FREQUENCY NETWORK TRANSMISSIONS IN HIGH SPEED TRANSIT SCENARIOS

FIELD OF THE INVENTION

The present disclosure is directed to methods and apparatus for the synchronization to multiple timing reference signals associated with multiple signal sources, including instances in which the multiple signal sources are associated with a common communication each having a different Doppler shift.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

At least one of the features of many cellular networks is the ability of the network to maintain connectivity with a user device as the user device moves throughout a geographical space, via the multiple cells of the network, which are each often associated with a different portion of the geographical space. Each cell is generally supported by at least one base transceiver station, which is adapted to support wireless signaling throughout a particular cell. As a user transitions between cells, the particular base transceiver station through which the user equipment communicates with the network can change. In many instances the network is able to adapt to the change of base transceiver station, and maintain an existing communicating connection as the user moves through the geographic space.

In some instances, each base transceiver station may have an associated set of frequencies, which it uses that are separate from the frequencies being used by other nearby or neighbor base transceiver stations. This can help avoid instances in which communications from one of the base transceiver stations will interfere with communications from another one of the base transceiver stations, such as instances in which each base transceiver station is separately supporting communications with different user devices.

In other instances, the multiple transceivers can purposely use the same set of frequencies, such as in instances in which a common frequency channel is used to broadcast a particular communication across the multiple transceivers. This can have the effect of creating a larger area of coverage for a particular communication. An example of such an instance is sometimes referred to as a single frequency network, where each of the multiple transceivers are sometimes referred to as remote radio heads.

At least one scenario that has adopted a single frequency type of network includes at least some scenarios involving a high speed train environment, where the anticipated speed at which the user device travels through a geographical region makes it beneficial to effectively create a virtual single transmission area formed using multiple transceivers. However given the relatively high speed of travel and the corresponding movement relative to multiple transceiver in which the user may be moving towards some of the transceivers while also simultaneously moving away from other ones of the transceivers, can result in the same signal being received by the user from the multiple signal sources having a relatively pronounced difference in Doppler shift.

The present inventors have recognized that it would be beneficial to make use of multiple transmission configuration indicator states each of which is associated with synchronizing with a separate timing reference signal, which are better adapted for accounting for differences in channel conditions associated with respectively receiving a common communication having a same set of data from multiple geographically spaced apart signal sources.

SUMMARY

The present application provides a method in a user equipment. The method includes receiving a higher layer configuration, where the user equipment is configured with two timing reference signals, including a first timing reference signal and a second timing reference signal for receiving a common communication having a same set of data from multiple signal sources. A downlink scheduling assignment including downlink control information is received in a control channel scheduling a physical downlink shared channel, wherein the downlink scheduling assignment comprises an indication of a transmission configuration indicator identifying two transmission configuration indicator states including a first transmission configuration indicator state, which indicates quasi-co-location information of a demodulation reference signal corresponding to the physical downlink shared channel with the first timing reference signal, and a second transmission configuration indicator state, which indicates quasi-co-location information of the demodulation reference signal corresponding to the physical downlink shared channel with the second timing reference signal. The physical downlink shared channel is then received according to the downlink scheduling assignment including the downlink control information.

According to another possible embodiment, a user equipment is provided. The user equipment includes a controller, and a transceiver that receives a higher layer configuration, where the user equipment is configured with two timing reference signals, including a first timing reference signal and a second timing reference signal for receiving a common communication having a same set of data from multiple signal sources. A downlink scheduling assignment including downlink control information in a control channel scheduling a physical downlink shared channel is further received via the transceiver, wherein the downlink scheduling assignment comprises an indication of a transmission configuration indicator identifying two transmission configuration indicator states including a first transmission configuration indicator state, which indicates quasi-co-location information of a demodulation reference signal corresponding to the physical downlink shared channel with the first timing reference signal, and a second transmission configuration indicator state, which indicates quasi-co-location information of the demodulation reference signal corresponding to the physical downlink shared channel with the second timing reference signal. The transceiver further receives the physical downlink shared channel according to the downlink scheduling assignment including the downlink control information.

According to a further possible embodiment, a method in a network entity is provided. The method includes transmitting a higher layer configuration to the user equipment for defining two timing reference signals, including a first timing reference signal and a second timing reference signal for receiving a common communication having a same set of data from multiple signal sources. A downlink scheduling assignment including downlink control information is transmitted in a control channel scheduling a physical downlink shared channel, wherein the downlink scheduling assignment comprises an indication of a transmission configuration indicator identifying two transmission configuration indicator states including a first transmission configuration indicator state, which indicates quasi-co-location information of a demodulation reference signal corresponding to the physical downlink shared channel with the first timing reference signal, and a second transmission configuration indicator state, which indicates quasi-co-location information of the demodulation reference signal corresponding to the physical downlink shared channel with the second timing reference signal.

According to a still further possible embodiment, a network entity for communicating with a user equipment is provided. The network entity includes a controller and a transceiver that transmits a higher layer configuration to the user equipment for defining two timing reference signals, including a first timing reference signal and a second timing reference signal for receiving a common communication having a same set of data from multiple signal sources. A downlink scheduling assignment including downlink control information is transmitted in a control channel scheduling a physical downlink shared channel, wherein the downlink scheduling assignment comprises an indication of a transmission configuration indicator identifying two transmission configuration indicator states including a first transmission configuration indicator state, which indicates quasi-co-location information of a demodulation reference signal corresponding to the physical downlink shared channel with the first timing reference signal, and a second transmission configuration indicator state, which indicates quasi-co-location information of the demodulation reference signal corresponding to the physical downlink shared channel with the second timing reference signal.

These and other features, and advantages of the present application are evident from the following description of one or more preferred embodiments, with reference to the accompanying drawings.

BRIEF DESCRIPTION OF THE DRAWINGS

FIG. 6 is a data structure of an exemplary transmission configuration indicator state having two quasi-co-location types;

FIG. 7 is an exemplary information element for a physical downlink shared channel configuration, which is used to configure user equipment specific physical downlink shared channel parameters;

FIG. 8 is an exemplary information element for a demodulation reference signal downlink configuration, which is used to configure downlink demodulation reference signals for a physical downlink shared channel;

Figure 9B:
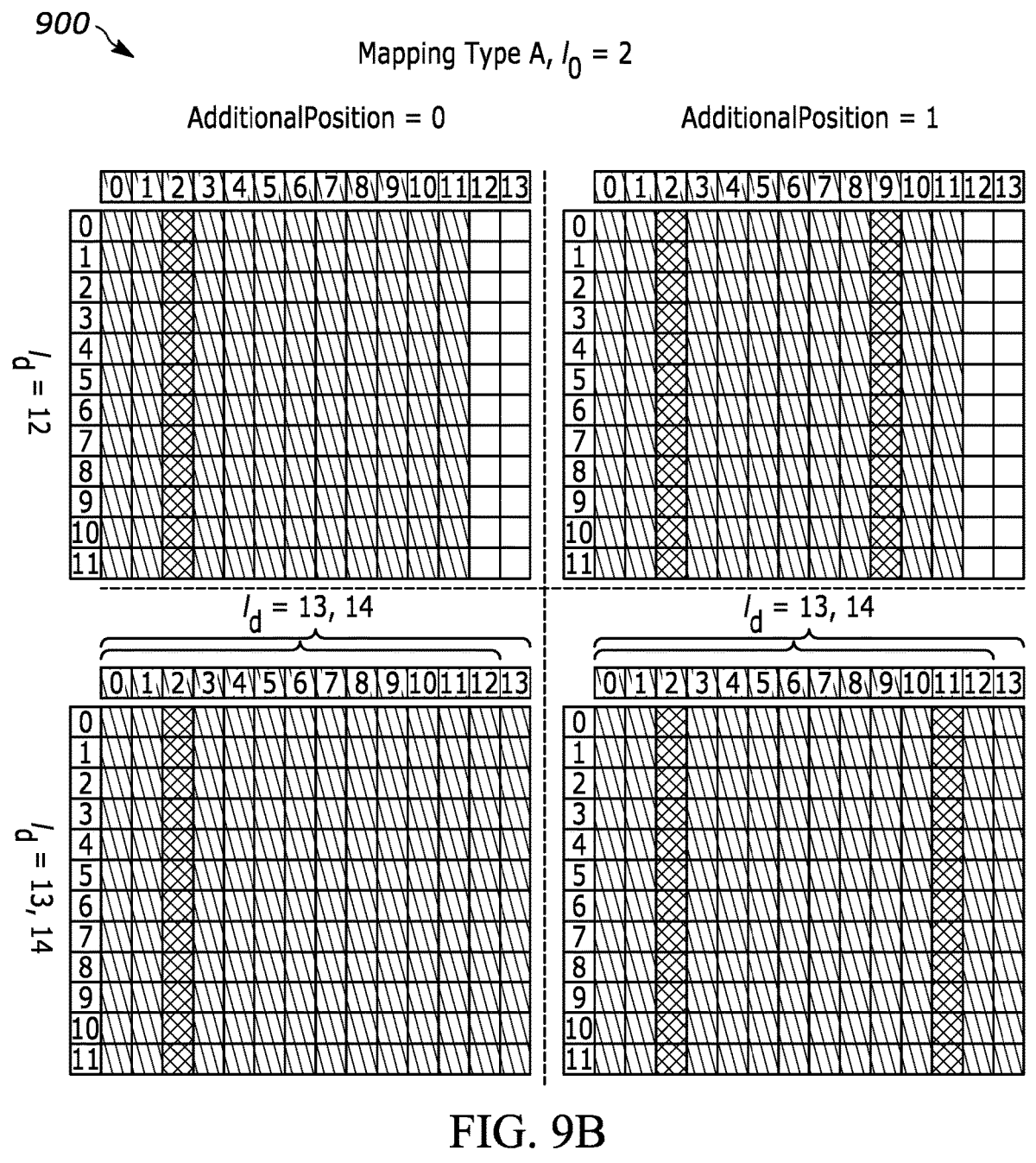

FIGS. 9A-9D are each portions of a resource map, which together form an exemplary demodulation reference signal pattern for mapping type A with front-load demodulation reference signals;

DETAILED DESCRIPTION OF THE PREFERRED EMBODIMENT(S)

Figure 1:
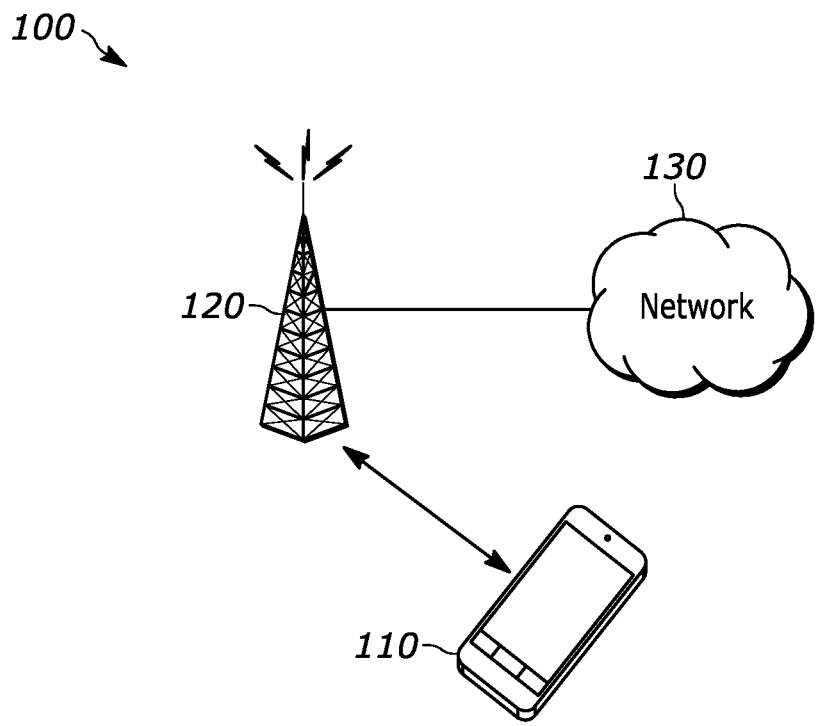
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide channel estimation improvement for single frequency network (SFN) transmissions in high speed train (HST) scenarios.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

High speed rail is expanding in Europe and Asia alongside their number of passengers with smart devices like laptops and mobile phones. Current technologies like Global System for Mobile communication-Railway (GSM-R), Long Term Evolution-Advanced (LTE-A), World Interoperability for Microwave Access (WiMAX) and Long Term Evolution for Railways (LTE-R), support data ranges from tens of kbps to tens of Mbps which may not be enough to handle demand for high-data-rates and increased reliability/latency for onboard broadband services. Enhancements to support High Speed Train (HST)-Single Frequency Network (SFN) scenarios is part of the Work Items (WI) for New Radio (NR) Release 17.

Figure 2:
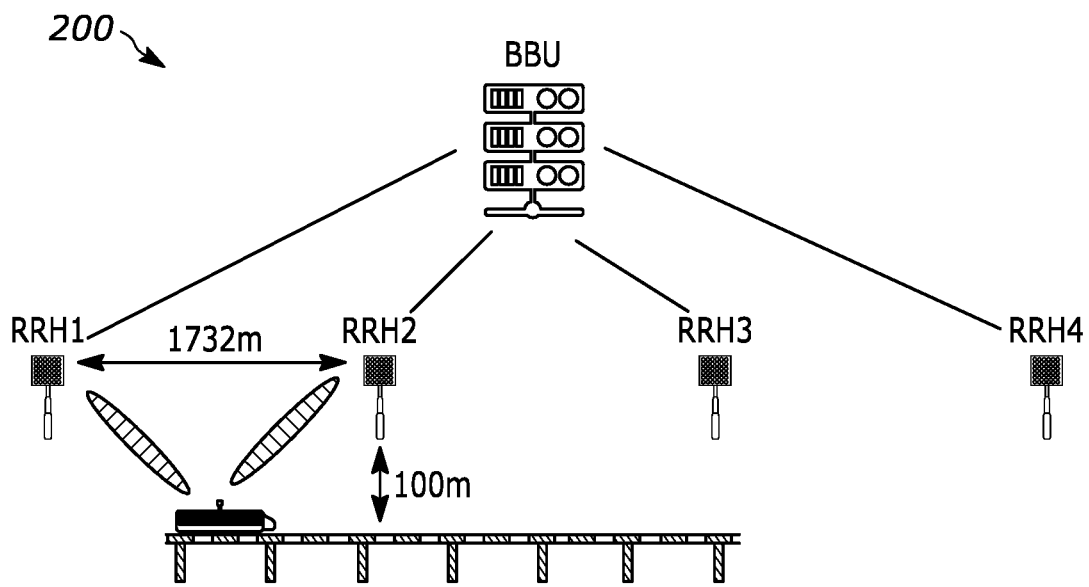
FIG. 2 is a diagram of a network environment of a single frequency network deployment for a high speed train viaduct scenario including a high speed rail line and a network environment including multiple remote radio heads for communicating with a user equipment traveling via the high speed rail line.

In SFN deployment scenario that was defined in 3rd Generation Partnership Project (3GPP) Radio Access Network (RAN) 4 (all cells are operating at the same frequency), multiple remote radio heads are located along the railway and connected to a central unit usually via fiber. They also share the same cell identification (ID). When the transmission from the Transmission and Reception Points (TRPs) within a cell are synchronized, SFN deployment can enlarge the cell coverage, reduce the frequency of handovers, and achieve transmission diversity and power gain. A typical 4 GHz deployment is shown in FIG. 2, which illustrates a diagram 200 of a network environment of a single frequency network deployment for a high speed train viaduct scenario including a high speed rail line and a network environment including multiple remote radio heads for communicating with a user equipment traveling via the high speed rail line. Based on a 6 dB pathloss difference between any two remote radio heads (RRHs), we expect the train would take advantage of simultaneous two RRH transmissions for sessions of at least 4 seconds long, assuming a train speed of 500 km/hr.

For SFN transmission (NR Release 15), the physical downlink shared channel (PDSCH) is repeated from two TRPs using a single scheduling downlink control information (DCI) indicating a single demodulation reference signal (DMRS) port and a single transmission configuration indicator (TCI) state. Consider the example in the above FIG. 2. The Doppler shift for the transmission from RRH1 is different than the Doppler shift from RRH2. When the receiver uses the long-term channel statistics associated with the indicated TCI state to estimate the aggregate channel, this can lead to estimation errors and performance degradation.

A single DCI multi-TRP transmission can be instead used (for example multi-TRP ultra-reliable low latency communication (URLLC) spatial division multiplexing (SDM) repetition scheme—scheme 1a in NR Rel. 16). The DCI will indicate DMRS ports from different code division multiplexing (CDM) groups along with a TCI codepoint indicating two TCI states. Some layers of the transmitted transport block (TB) will be sent from RRH1 and some layers from RRH2. This can cause interlayer interference and may not achieve a power gain, hence no effective increase in cell coverage increase.

Per the teachings of the present application, the user equipment (UE) is enabled to receive the data from the same ports from each TRPs to achieve a power gain, while the channel from each TRP can be estimated independently to improve performance.

Consider the HST scenario illustrated in FIG. 2. Due to the high speed moving train (speeds up to 500 km/hour), the Doppler shift can be relatively large, and hence the channel can be time-varying (time-averaging may not be able to improve estimation accuracy. However, the direction and velocity of the train do not change rapidly, at least during the transmission duration/occasion, allowing for better prediction algorithms at the transceiver. The Doppler shift of the signal from the nearest RRH can be considered as a single tap channel where the Doppler shift is calculated as:

$$f_d(t) = f \frac{v}{c} \cos\theta(t) \tag{1}$$

where f is the carrier frequency, v is the train speed, c is the speed of light and θ is the angle between the line of sight (LOS) of sight direction and the moving direction. At 4 GHz, this Doppler shift ranges from 0 Hz to 1 kHz when the train is halfway between TRPs.

Figure 3:
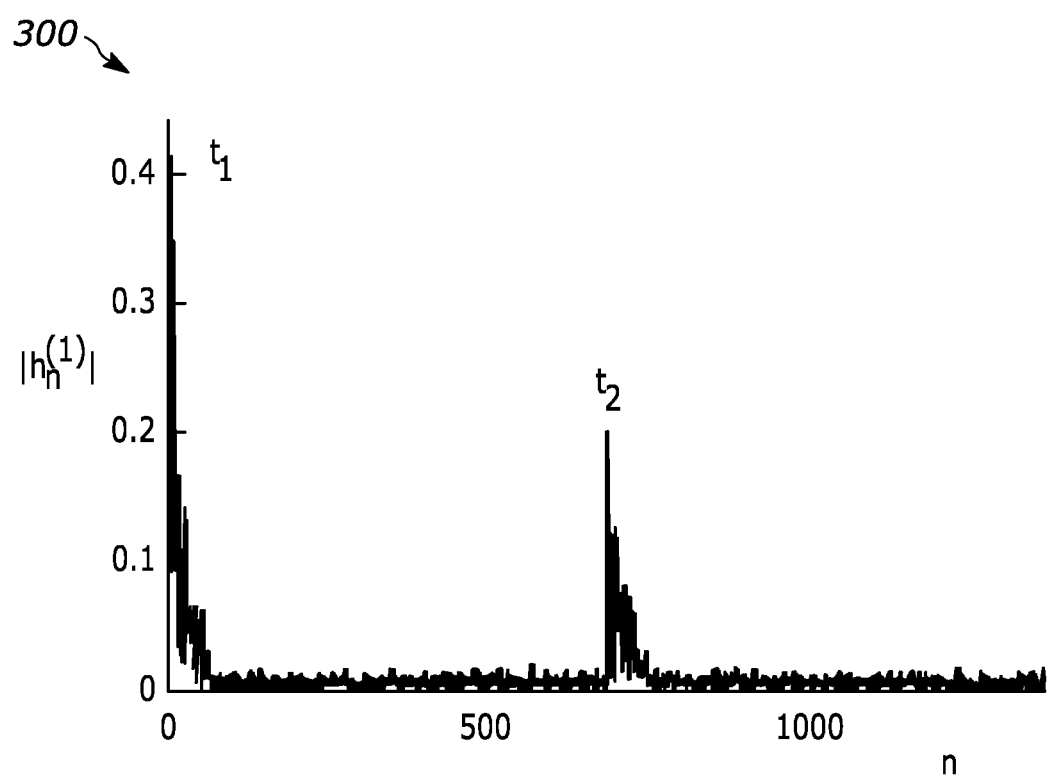
FIG. 3 is a graph of an example of a delay profile for a two-tap high speed train channel model for a single frequency network transmission.

To model an SFN transmission from two TRPs, a two-tap HST channel model can be used. The channel model takes into consideration, the two strongest paths corresponding to two nearest RRHs, and it captures dynamic propagation condition, including dynamic Doppler shift, channel tap delay, and channel tap power. An example of the delay profile for a two-tap HST channel model is shown in FIG. 3. FIG. 3 illustrates a graph 300 of an example of a delay profile for a two-tap high speed train channel model for a single frequency network transmission.

Since the train is moving farther away from one of the RRHs and moving closer to the next RRH (along the direction of travel), the Doppler spread can be as significant as 2 kHz, meaning a coherence time of 0.5 ms (duration of 1 slot for subcarrier spacing (SCS)=30 KHz). The Doppler spread causes a carrier frequency offset (CFO). Another source of CFO can be caused by the frequency mismatch between the transmitter and the receiver (usually on the order of 100 khz at 5 GHz for 20 ppm handsets). CFO usually causes:

the phase rotation common to all carriers
the signal amplitude distortion common to all carriers; and
interference of each carrier on the symbols located on its neighboring carriers. CFO caused by oscillator imperfections can be better estimated and corrected. CFO from Doppler spread is harder to compensate for.

Figures 4, 5:
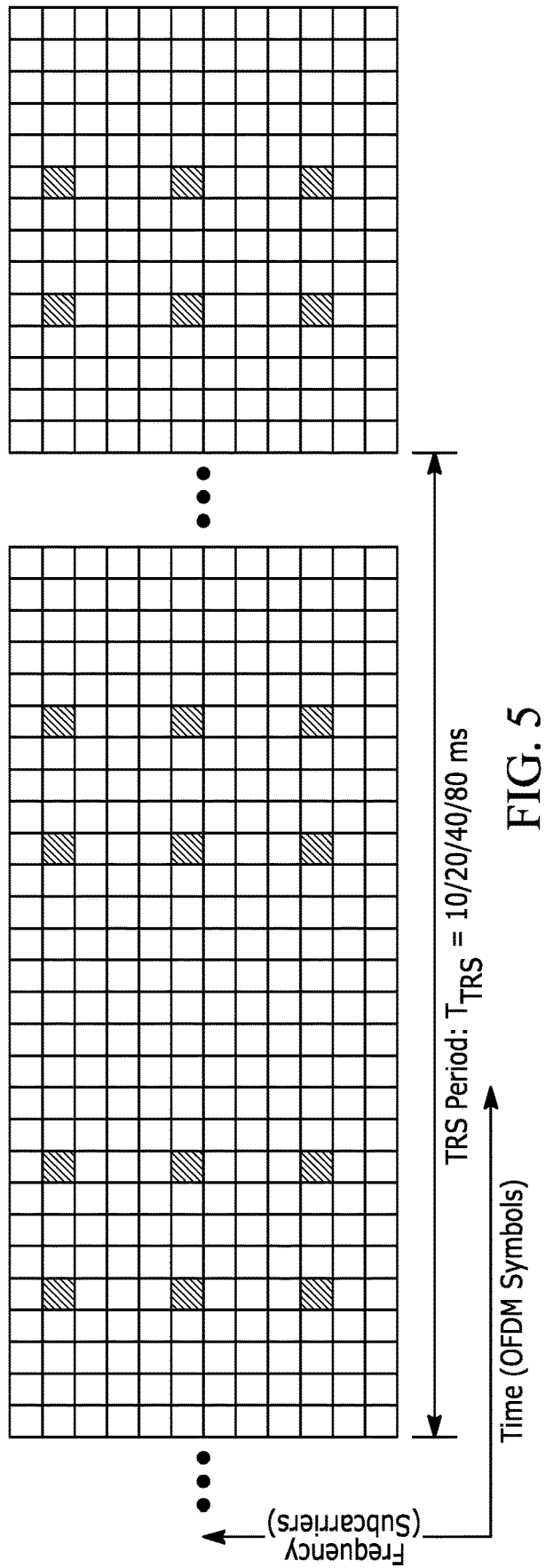
FIG. 4 is an exemplary data structure for use with a tracking reference signal including a non-zero-power channel state information reference signal resource set.
FIG. 5 is a resource map of an exemplary tracking reference signal configuration.
Figure 9A:
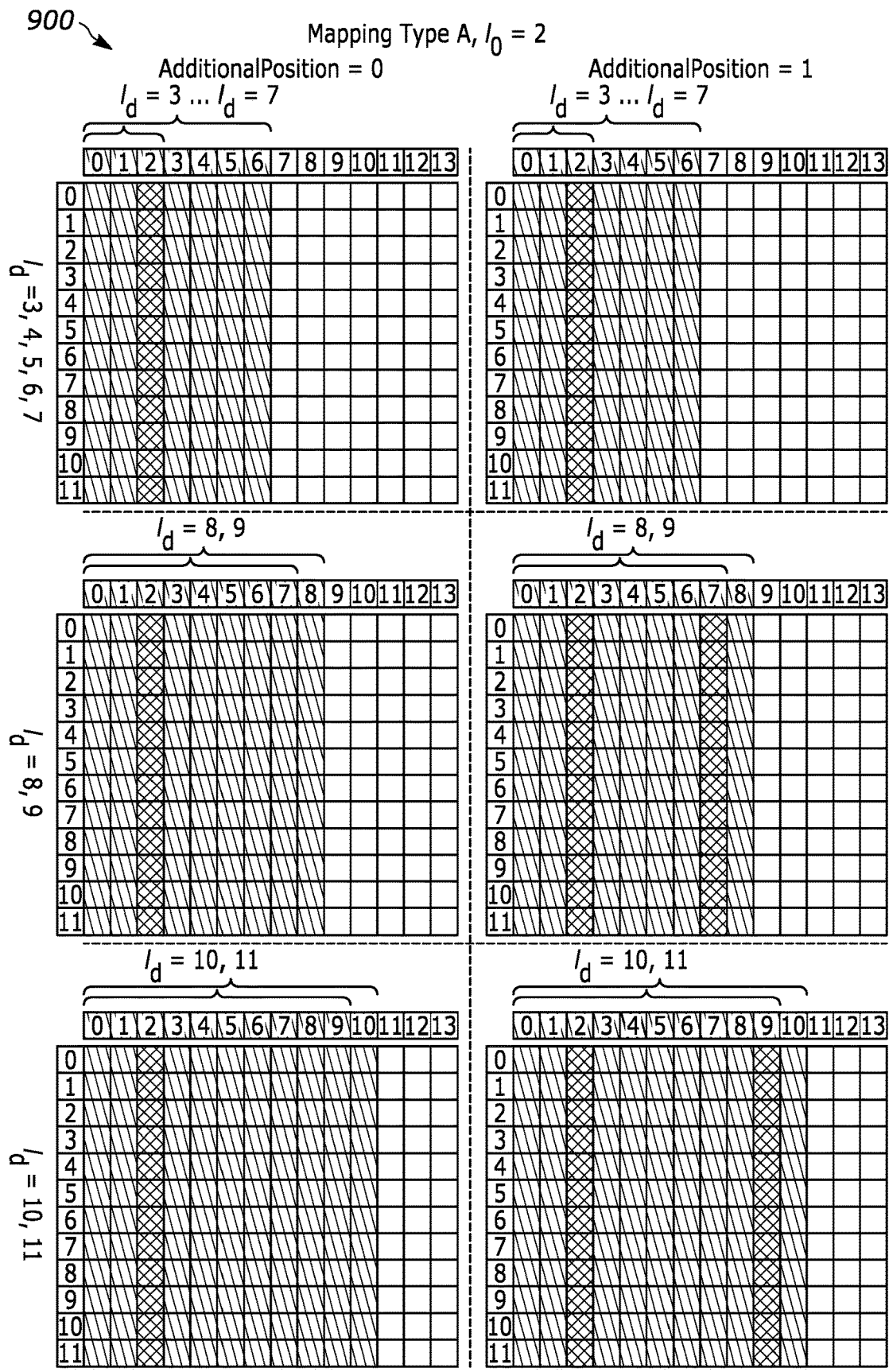
Figure 9C:
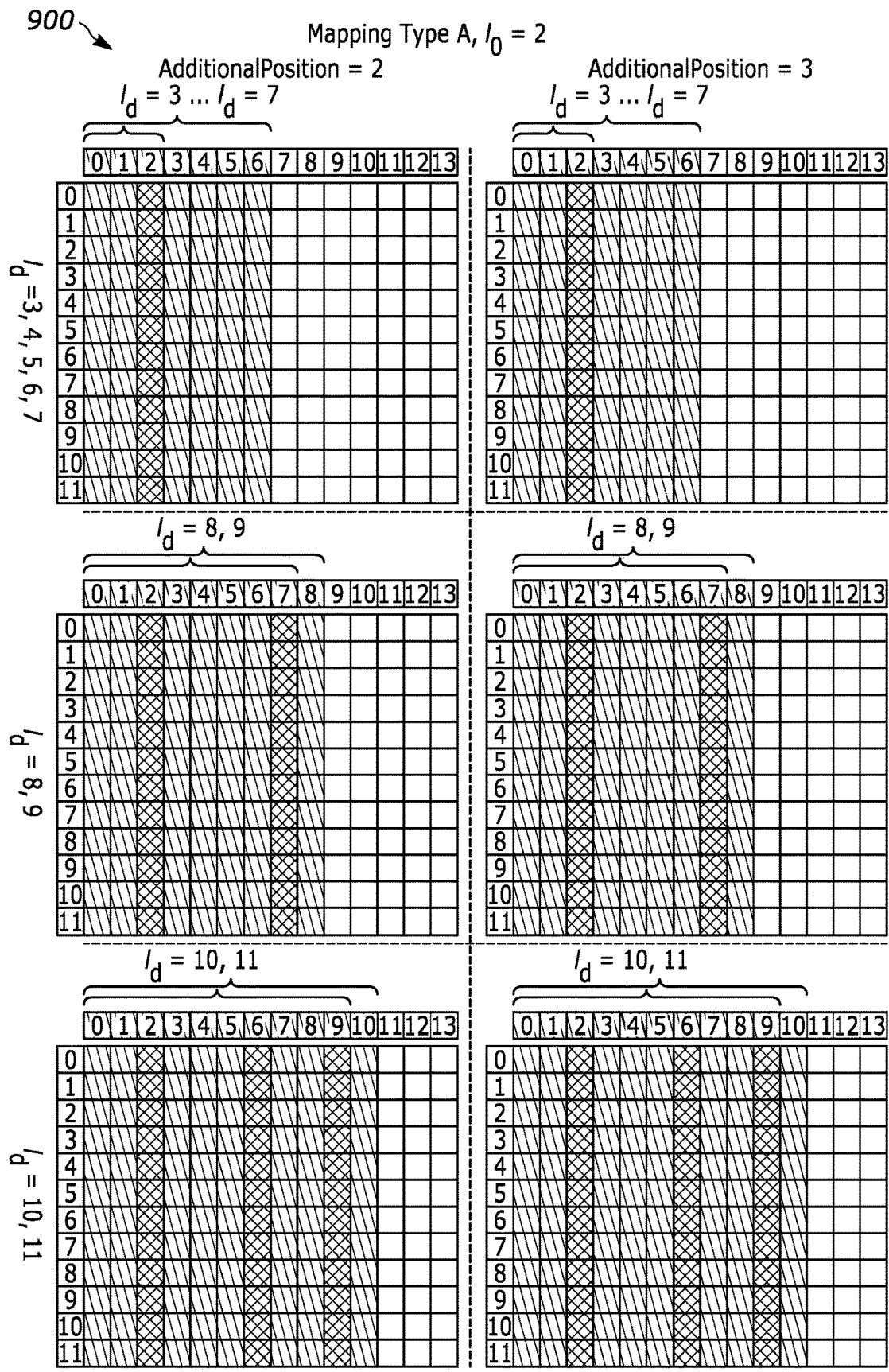
Figure 9D:
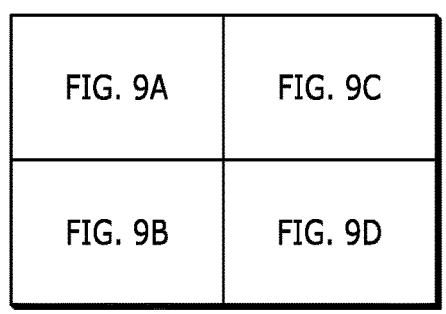

In NR release 15, a tracking reference signal (TRS) is transmitted for establishing fine time and frequency synchronization at the UE to aid in demodulation of PDSCH, particularly for higher order modulations. A TRS is a non-zero power (NZP)-channel state information (CSI)-reference signal (RS) resource set with trs-info set to true. FIG. 4 illustrates an exemplary data structure 400 for use with a tracking reference signal including a non-zero-power channel state information reference signal resource set, where trs-Info (TS 38.331, TS 38.214-5.2.2.3.1) indicates that the antenna port for all NZP-CSI-RS resources in the CSI-RS resource set is the same. The TRS contains either 2 or 4 periodic CSI-RS resources with periodicity $2^{-\mu} \cdot Xp$ slots where Xp=10, 20, 40, or 80 and where $\mu$ is related to the SCS, i.e. $\mu$=0, 1, 2, 3, 4 for 15, 30, 60, 120, 240 kHz, respectively. The slot offsets for the 2 or 4 CSI-RS resources are configured such that the first pair of resources are transmitted in one slot, and the second pair (if configured) are transmitted in the next (adjacent) slot. All four resources are single port with density 3 (see FIG. 5). More specifically, FIG. 5 illustrates a resource map 500 of an exemplary tracking reference signal configuration.

In the illustrated embodiment, the two CSI-RS within a slot are always separated by four symbols in the time domain. This time-domain separation sets a limit for the maximum frequency error that can be compensated. Therefore, At SCS=15 KHz, CFO_max=1750 KHz
At SCS=30 KHz, CFO_max=3500 KHz Likewise, the frequency-domain separation of four subcarriers sets a limit for the maximum timing error that can be compensated. The maximum number of TRS a UE can be configured with is a UE capability:

The maximum number of TRS resource sets (per component carrier (CC)) the UE is able to track simultaneously: Candidate value set {1 to 8};
The maximum number of TRS resource sets configured to UE per CC: candidate value set: {1 to 64}. In at least some instances, the UE may be mandated to report at least 8 for FR1 and 16 for FR2;
The maximum number of TRS resource sets configured to UE across CCs: candidate value set: {1 to 256}. In at least some instances, the UE may be mandated to report at least 16 for FR1 and 32 for FR2.

Furthermore, an aperiodic TRS is a set of aperiodic CSI-RS for tracking that may be optionally configured, but a periodic TRS should always be configured, and its time and frequency domain configurations (except for the periodicity) should match those of the periodic TRS. The UE may assume that the aperiodic TRS resources are quasi-co-located with the periodic TRS resources.

A TCI state (see FIG. 6 and as configured by radio resource control (RRC)) will have two quasi-co-located (QCL) types (i.e. two reference signals) with the second QCL type only for operation in FR2. FIG. 6 illustrates a data structure 600 of an exemplary transmission configuration indicator state having two quasi-co-location types.

For the reception of physical downlink control channel (PDCCH)/physical downlink shared channel (PDSCH) DMRS, QCL typeA properties (Doppler shift, Doppler spread, average delay, delay spread) can be inferred from a periodic TRS. In turn for periodic TRS, QCL typeC properties (Average delay, Doppler shift) can be inferred from a synchronization signal block (SSB).

The DMRS is used to estimate channel coefficients for coherent detection of the physical channels. For downlink, the DMRS is subject to the same precoding as the PDSCH. NR first defines two time-domain structures for DMRS according to the location of the first DMRS symbol:

1. Mapping Type A, where the first DMRS is located in the second and the third symbol of the slot and the DMRS is mapped relative to the start of the slot boundary, regardless of where in the slot the actual data transmission occurs.
2. Mapping Type B, where the first DMRS is positioned in the first symbol of the data allocation, that is, the DMRS location is not given relative to the slot boundary, rather the DMRS location is relative to where the data is located.

The mapping of PDSCH transmission can be dynamically signaled as part of the downlink control information (DCI).

Moreover, the DMRS has two types: that is, Types 1 and 2, which are distinguished in frequency-domain mapping and the maximum number of orthogonal reference signals. Type 1 can provide up to four orthogonal signals using a single-symbol DMRS and up to eight orthogonal reference signals using a double-symbol DMRS. For four orthogonal signals, ports 1000 and 1001 use even-numbered subcarriers and are separated in the code domain within the CDM group (length-2 orthogonal sequences in the frequency domain). Antenna ports 1000 and 1001 belong to CDM group 0, since they use the same subcarriers. Similarly, ports 1002 and 1003 belong to CDM group 1 and are generated in the same way using odd-numbered subcarriers. The DMRS Type 2 has a similar structure to Type 1 but Type 2 can provide 6 and 12 patterns depending on the number of symbols. Four subcarriers are used in each resource block and in each CDM group defining three CDM groups.

Note that the configuration of the DMRS Type is provided through higher-layer signaling independently for each PDSCH and physical uplink shared channel (PUSCH), each mapping Type (A or B) and each band width part (BWP) independently (see RRC configuration in FIGS. 7 and 8). FIG. 7 illustrates an exemplary information element 700 for a physical downlink shared channel configuration (PDSCH-Config), which is used to configure user equipment specific physical downlink shared channel parameters. FIG. 8 illustrates an exemplary information element 800 for a demodulation reference signal downlink configuration (DMRS-DownlinkConfig), which is used to configure downlink demodulation reference signals for a physical downlink shared channel.

The time domain mapping of the DMRS patterns can be decomposed to two parts: the first part defines the DMRS pattern used for the front-load DMRS, and then the second part defines a set of additional DMRS symbols inside the scheduled data channel duration which are either single-symbols, or double-symbols depending on the length of the front-load DMRS. Inside the scheduled time-domain allocation of a PDSCH, the UE may expect up to 4 DMRS symbols.

The location of the DMRS is defined by both higher-layer configuration and dynamic (DCI-based) signaling:
  dmrs-TypeA-Position
  maxLength
  dmrs-AdditionalPosition When double-symbol DMRS is used, there can be up to one more double-symbol DMRS (total 4 DMRS symbols inside the PDSCH allocation). Different DMRS patterns for mapping Type A with front-load DMRS are shown in FIGS. 9A-9D and 10.

Figure 10:
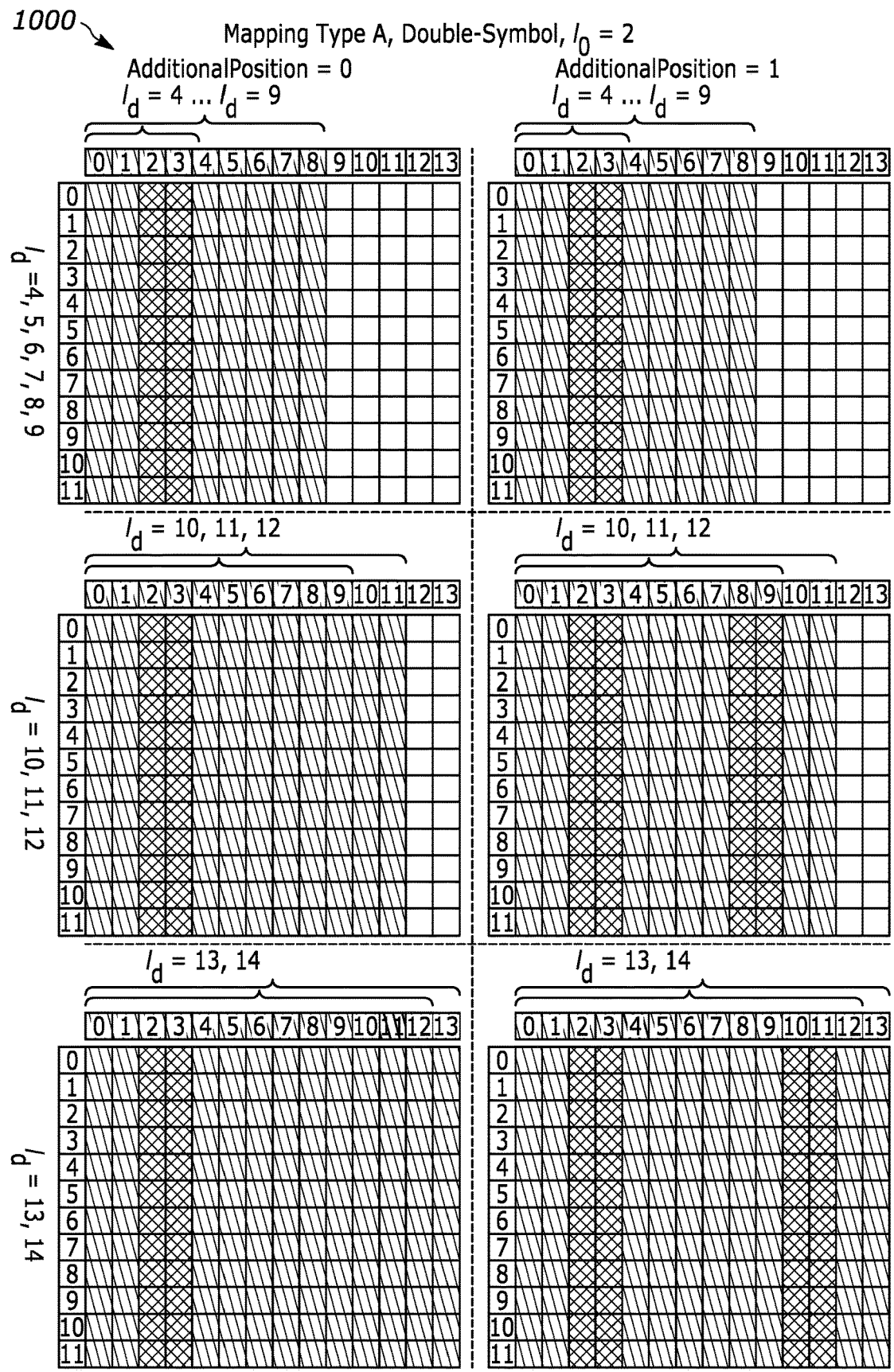
FIG. 10 is a resource map of a further exemplary demodulation reference signal pattern for mapping type A with front-load demodulation reference signals.

More specifically, FIGS. 9A-9D illustrate a resource map 900 of an exemplary demodulation reference signal pattern for mapping type A with front-load demodulation reference signals, and FIG. 10 illustrates a resource map 1000 of a further exemplary demodulation reference signal pattern for mapping type A with front-load demodulation reference signals.

In NR Rel-15, in the absence of CSI-RS configuration, and unless otherwise configured, the UE may assume PDSCH DMRS and synchronization signal (SS)/physical broadcast channel (PBCH) block antenna ports are quasi co-located with respect to Doppler shift, Doppler spread, average delay, delay spread, and, spatial Rx parameters (if applicable). However, a CSI-RS for tracking can be used as a QCL reference (e.g. larger bandwidth than an SS/PBCH block).

Furthermore, the UE may assume that the PDSCH DMRS within the same CDM group are quasi co-located with respect to Doppler shift, Doppler spread, average delay, delay spread, and spatial Rx. The UE may then perform a joint estimation of DMRS ports which are CDMed using the same long-term statistics, and it is not required to measure, or use, different long-term statistics for different DMRS ports of the same PDSCH.

Figure 11:
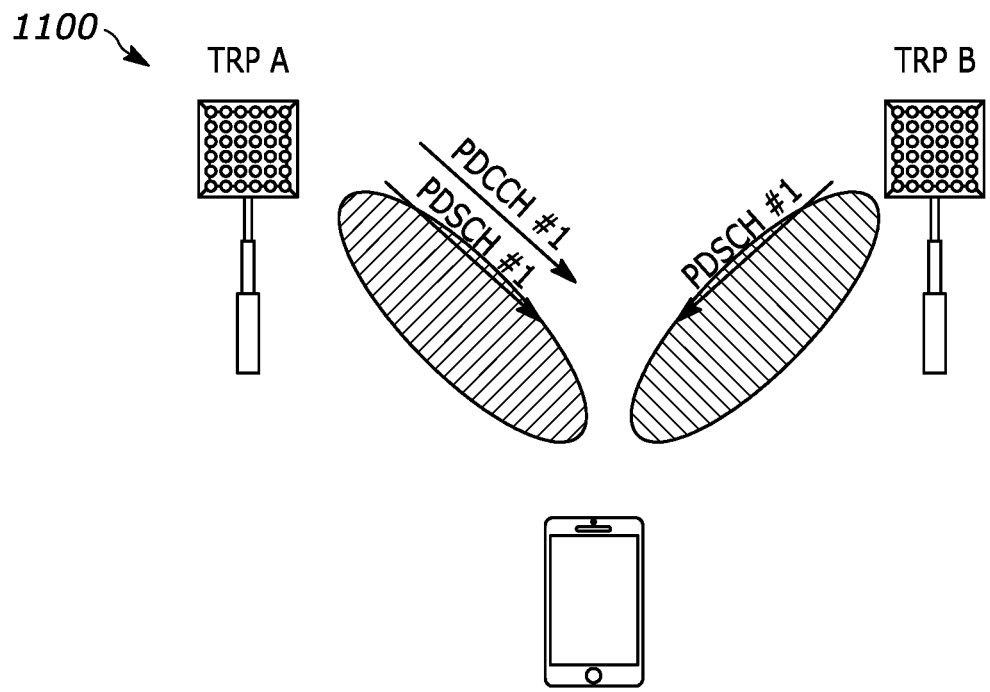
FIG. 11 is a partial network environment illustrating a pair of transmit reception point transmissions from a pair of remote radio heads in support of a single frequency network transmission involving a single physical downlink shared channel.

For the case of two TRP transmission from two RRHs to the high-speed train, a single-frequency network (SFN) transmission (see FIG. 11) where the same packet is sent with exactly the same resource block from multiple TRPs. More specifically, FIG. 11 illustrates a partial network environment 1100 illustrating a pair of transmit reception point transmissions from a pair of remote radio heads in support of a single frequency network transmission involving a single physical downlink shared channel.

The downlink scheduling grant would indicate the DL antenna ports along with single TCI state just as for regular single TRP transmission. In the time a UE can be configured with two TRSs, one from TRP A and one from TRP B, the TCI state would point to only one of them. Due to the Doppler spread, inter-carrier interference as well as poor channel estimation, would degrade performance.

Figure 12:
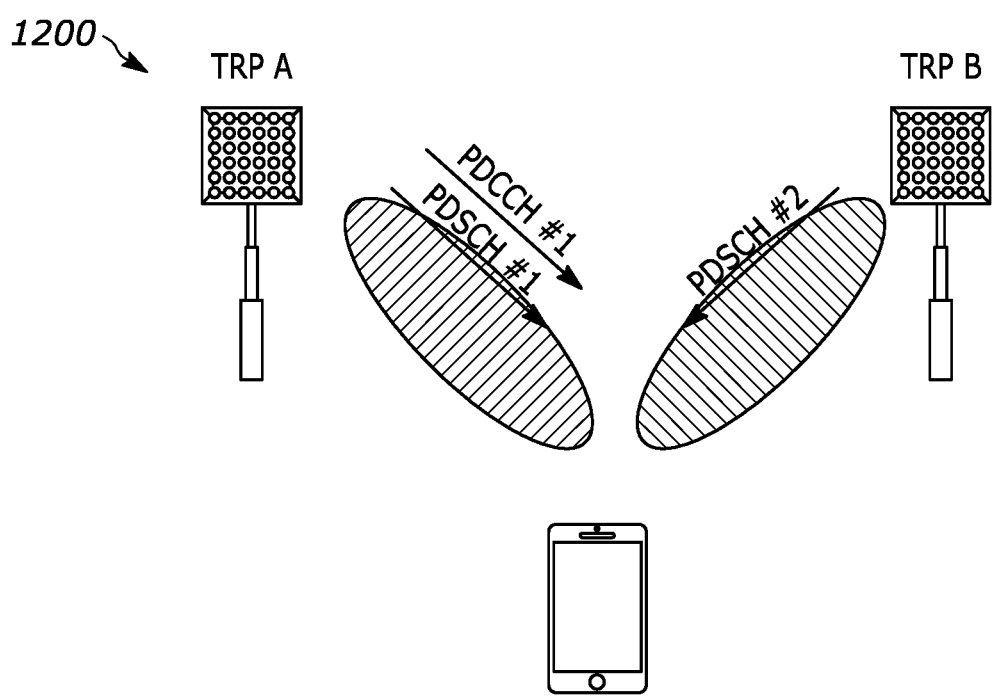
FIG. 12 is a partial network environment illustrating a pair of transmit reception point transmissions from a pair of remote radio heads in support of a single frequency network transmission involving a respective pair of physical downlink shared channels.

Another option currently available in NR Rel. 16, is to use a single DCI two PDSCH transmission (see FIG. 12). More specifically, FIG. 12 illustrates a partial network environment 1200 illustrating a pair of transmit reception point transmissions from a pair of remote radio heads in support of a single frequency network transmission involving a respective pair of physical downlink shared channels.

The downlink scheduling grant would indicate the downlink (DL) antenna ports along with a TCI codepoint indicating two TCI states. The same scheme was agreed for multi-TRP URLLC SDM transmission (scheme 1a). A single codeword with one RV is used across all spatial layers or layer sets. From the UE perspective, different coded bits are mapped to different layers or layer sets with the same mapping rule as in Rel-15. Each layer set is associated with one TCI and one set of DMRS port(s) (2 CDM groups are used). The first TCI state corresponds to the CDM group of the first antenna port indicated by the antenna port indication table.

Figure 13:
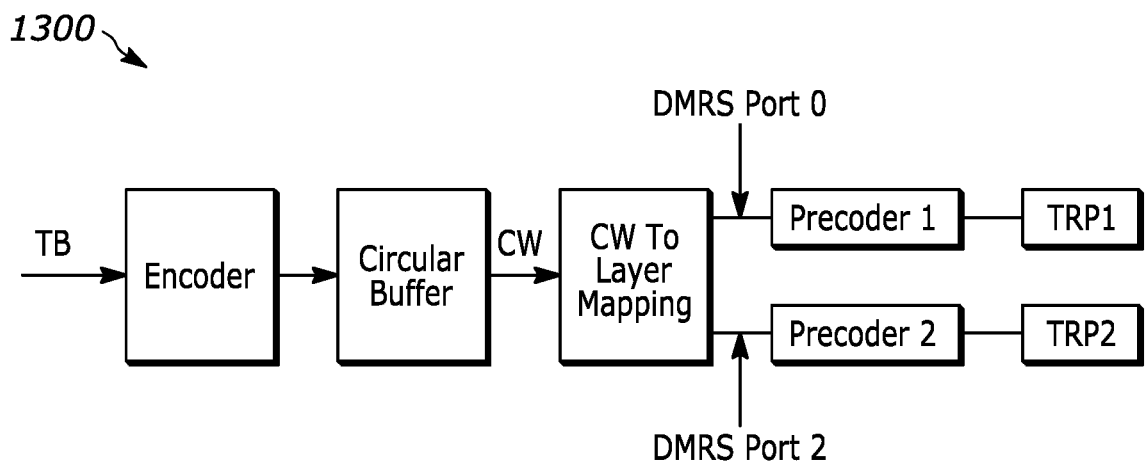
FIG. 13 is a block diagram of an antenna port mapping of a single codeword with one redundancy version across multiple spatial layers, each layer being respectively associated with a demodulation reference signal port corresponding to one of multiple transmit and reception points.

FIG. 13 illustrates a block diagram 1300 of an antenna port mapping of a single codeword with one redundancy version across multiple spatial layers, each layer being respectively associated with a demodulation reference signal port corresponding to one of multiple transmit and reception points.

Moreover, it was agreed in Release 16 that when 2 TCI states are indicated by a TCI codepoint, for DMRS type 1 and type 2 for enhanced mobile broadband (eMBB) and URLLC scheme-1a, if indicated DMRS ports are from two CDM groups, the first TCI state corresponds to the CDM group of the first antenna port indicated by the antenna port indication table. The second TCI state is applied to the second indicated CDM group. Therefore, each TCI state could point to a different TRS signal configured for the UE. With the transmission ports belonging to different CDM groups, the UE could estimate the channel from TRP A and TRP B. However, the scheme suffers from interlayer interference, and does not achieve a power gain like the SFN transmission which may be important for increasing coverage.

The following is a list of Agreements in Release 16 for multi transmit and reception points.

Agreement

TCI indication framework shall be enhanced in Rel-16 at least for eMBB:

Each TCI code point in a DCI can correspond to 1 or 2 TCI states
    When 2 TCI states are activated within a TCI code point, each TCI state corresponds to one CDM group, at least for DMRS type 1
    FFS design for DMRS type 2
    FFS: TCI field in DCI, and associated MAC-CE signaling impact Agreement For TCI state configuration in order to enable one or two TCI states per a TCI code point,
  MAC-CE enhancement to map one or two TCI states for a TCI code point where further detailed design is determined in RAN2.
  FFS whether increasing the number of bits of TCI field in DCI
  Include in LS to RAN2

Agreement
    Support following principles for DMRS port indication design for NCJT transmission based on single-PDCCH multi-TRP, at least for single front-load symbol and eMBB
        Antenna port field size is the same as Rel-15, at least for DCI format 1-1
        At least support following layer combinations from two TRPs indicated by antenna port field:
            1+1, 1+2, 2+1, 2+2 for single CW and SU, at least for DCI format 1-1
            To be evaluated to determine whether introducing following design principles for DMRS entries in RAN1#98:
            1+3 and/or 3+1
                MU cases, i.e. between NCJT UE+NCJT UE and NCJT UE+S-TRP UE
                Two CWs for the case of total layers of NCJT reception more than 4
Agreement
    When 2 TCI states are indicated by a TCI code point, at least for DMRS type 1 and type 2 for eMBB, if indicated DMRS ports are from two CDM groups,
        the first TCI state is applied to the first indicated CDM group
        the second TCI state is applied to the second indicated CDM group
    FFS: the definition of the first or second indicated CDM group
    FFS: Whether above applies for only Rel-15 DMRS or for both Rel-15 and Rel-16 DMRS
Agreement
    When 2 TCI states are indicated by a TCI code point, for DMRS type 1 and type 2 for eMBB and URLLC scheme-1a, if indicated DMRS ports are from two CDM groups, the first TCI state corresponds to the CDM group of the first antenna port indicated by the antenna port indication table.
Agreement
    For single-PDCCH based multi-TRP/Panel transmission, the number of bits of TCI field in DCI is 3 if higher layer parameter tci-PresentInDCI is enabled.
Agreement
    For DMRS type-1, for layer combination 1+2, at least support DMRS entry {0, 2, 3} with 2 CDM groups without data
Agreement
    The maximum number of activated TCI states in mTRP operation is 8. The number of bits of TCI field in DCI is 3 if higher layer parameter tci-PresentInDCI is enabled. The total number of simultaneously activated TCI states is up to 8.
Conclusion
    The following is not supported in Rel-16 due to lack of consensus and time:
        Enhancement on TCI framework by indicating SSB/PCI from a non-serving cell for multi-TRP/panel transmission for an inter-cell scenario
Agreement
    Support two PTRS ports for single-PDCCH based multi-TRP/Panel transmission at least for eMBB and URLLC scheme la if two TCI states are indicated by one TCI code point, whereas the first/second PTRS port is associated with the lowest indexed DMRS port within the DMRS ports corresponding to the first/second indicated TCI state, respectively
    RRC signalling is used to configure the two PTRS ports
    Note that whether supporting two PTRS ports is subject to UE capability
    FFS: Applicability for other cases
Agreement
    DMRS entry {0, 2, 3} can be expected by the UE only when two TCI states are indicated
Agreement
    For DMRS type-2, for layer combination 1+2, at least support DMRS entry {0, 2, 3} with 2 CDM groups without data
    {0, 2, 3} is used assuming SU-MIMO
    For DMRS type-1, {0, 2, 3} is used assuming SU-MIMO
Conclusion
    If the indicated TCI states for multi-TRP operation cannot be received by a UE simultaneously, it is up to UE implementation how to handle this case.
Agreement
    For single-DCI based Multi-TRP/panel transmission with at least one configured TCI states for the serving cell of scheduled PDSCH containing 'QCL-TypeD',
        If the offset between the reception of the PDCCH and the corresponding PDSCH is less than timeDurationForQCL and after the reception of activation command of TCI states for UE specific PDSCH, the UE may assume that DMRS ports of PDSCH follows QCL parameters indicated by default TCI state(s) as following:
            Use the TCI-states corresponding to the lowest codepoint among the TCI codepoints containing two different TCI states which are activated for PDSCH.
        If all the TCI codepoints are mapped to a single TCI state, then Rel-15 behavior is followed
        The support of this feature is part of UE capability.
Agreement
    For single-DCI based M-TRP URLLC scheme 3 & 4
        The maximum number of TCI states is 2
        Resource allocation in time domain:
            Support same number of consecutive symbols scheduled for transmission occasion
Agreement
    For schemes 3 and 4, the maximum number of transmission layers per TRP is up to 2
        The supported maximum TBS size is dependent on UE capability
    For single-DCI based M-TRP URLLC schemes 2a/2b/3/4, indicated DMRS ports are from one CDM group.
    For single-DCI based M-TRP URLLC schemes, the number of transmission occasions is indicated by following:
        For scheme 4, TDRA indication is enhanced to additionally indicate the number of PDSCH transmission occasions by using PDSCH-TimeDomainResourceAllocation field.
        The maximum number of repetition is FFS.
Agreement
    For single-DCI based M-TRP URLLC scheme 4, the same value of SLIV is applied to all transmission occasions.
Agreement
    For single-DCI based M-TRP URLLC scheme 4, $RV_{id}$ indicated by the DCI is used to select a RV sequence to be applied to transmission occasions
        whereas RV sequences are the same with Table 5.1.2.1-2 in Rel-15 NR
Agreement
    For single-DCI based M-TRP URLLC scheme 4, selected RV sequence is applied to transmission occasions associated to the first TRP (i.e. the first TCI state). The RV sequence associated to the second TRP (i.e. the second TCI state) is determined by a RV offset from that selected RV sequence whereas the offset is RRC configured.

Agreement

For single-DCI based M-TRP URLLC scheme 4, for TCI state mapping to PDSCH transmission occasions,
  Both options 1 and 2 are supported and switched by RRC signalling
    Option 1: support Cyclical mapping, e.g. TCI states #1#2#1#2 are mapped to 4 transmission occasions if 2 TCI stats are indicated
    Option 2: support Sequential mapping, e.g. TCI states #1#1#2#2 are mapped to 4 transmission occasions if 2 TCI stats are indicated
  For more than 4 transmission occasions, above is repeated (for example, 8 transmission occasion in case of option 2: #1#1#2#2#1#1#2#2)
  FFS: The mapping between RV sequence and transmission occasions if the offset between the DCI and scheduled PDSCH is less than the threshold
  FFS: Whether both or one of the options is UE optional or not Agreement For single-DCI based M-TRP URLLC scheme 4, the candidate values of URLLCRepNum is up to 16
  FFS: UE capability for maximum value of URLLCRepNum (including whether UE capability is needed)

Agreement

For single-DCI based M-TRP URLLC scheme 4, support candidate values of URLLCRepNum with:
  {2, 3, 4, 5, 6, 7, 8, 16}

Agreement

Every transmission occasion of the TB has one TCI and one RV. RV and TCI can be same or different across transmission occasions
  The maximum number of TCI states used is 2 (single DCI)
  $RV_{id}$ indicated by the DCI is used to select a RV sequence to be applied to transmission occasions
    whereas RV sequences are the same with Table 5.1.2.1-2 in Rel-15 NR
  Selected RV sequence is applied to transmission occasions associated to the first TRP (i.e. the first TCI state). The RV sequence associated to the second TRP (i.e. the second TCI state) is determined by a RV offset from that selected RV sequence whereas the offset is RRC configured.

Agreement

For single-DCI based M-TRP URLLC scheme 3 & 4
  The maximum number of TCI states is 2
  Resource allocation in time domain:
    Support same number of consecutive symbols scheduled for transmission occasion
  For scheme 3
    All transmission occasions are in a single slot by NW implementation without dropping.
    FFS for DL/UL switching within the slot Agreement For schemes 3 and 4, the maximum number of transmission layers per TRP is up to 2
  The supported maximum TBS size is dependent on UE capability
For single-DCI based M-TRP URLLC schemes 2a/2b/3/4, indicated DMRS ports are from one CDM group.
For single-DCI based M-TRP URLLC schemes, the number of transmission occasions is indicated by following:
  For scheme 3, the number of transmission occasions is implicitly determined by the number of TCI states indicated by a code point whereas one TCI state means one transmission occasion and two states means two transmission occasions.

Agreement

For single-DCI based M-TRP, URLLC schemes 2a/2b/3 can be differentiated by the following:
  when higher layer parameter URLLSchemeEnabler is configured, it is set to enable one scheme semi-statically among schemes 2a, 2b and 3, if schemes are supported.

In accordance with at least one embodiment, the scheduling DCI can be configured with a TCI codepoint pointing to two TCI states, whose QCL info are the TRSs from the two RRHs. The DCI also carries one port or more belong to the same CDM group. This would trigger the UE to use the some PDSCH DMRS resource elements (REs) to estimate the channel from RRH1 and use the rest of the PDSCH DMRS REs to estimate the channel from RRH2. Several ways to use the DMRS REs for estimation are discussed. We can also enable URLLC schemes to enable same RV repetition that would also achieve a power gain.

Figure 14:
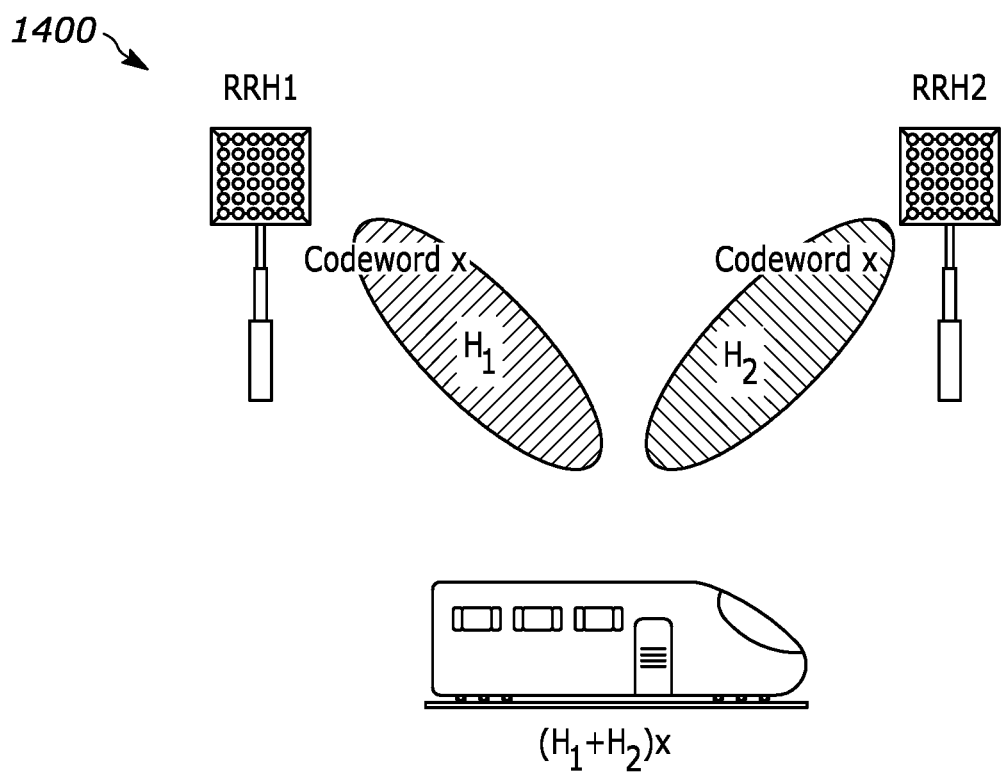
FIG. 14 is a partial network environment illustrating a pair of transmit reception point transmissions from a pair of remote radio heads in support of a single frequency network transmission involving a pair of timing reference signals for respectively synchronizing with each one of the pair of remote radio heads.

In one embodiment, the UE is configured with two TRSs (i.e., two NZP-CSI-RS-ResourceSet configured with higher layer parameter trs-Info), establishing fine time/frequency synchronization with respect to RRH1 and RRH2 respectively (see FIG. 14). More specifically, FIG. 14 illustrates a partial network environment 1400 illustrating a pair of transmit reception point transmissions from a pair of remote radio heads in support of a single frequency network transmission involving a pair of timing reference signals for respectively synchronizing with each one of the pair of remote radio heads. The UE receives a downlink scheduling DCI, indicating DMRS ports (e.g., one set of DMRS port(s); the number of DMRS ports equal to the number of layers of the transmission) from one CDM group (unlike scheme 1a), and a two TCI state codepoint. The two TCI states may indicate the two TRSs as their source reference signals (RSs) (e.g., a first TRS as source RS for a first TCI state, and a second TRS as source RS for a second TCI state). In one example, a TCI state may indicate quasi-colocation (QCL) information with a source reference signal such as CSI-RS which may in turn be QCL with a TRS. For the reception of PDSCH DMRS, QCL typeA properties (Doppler shift, Doppler spread, average delay, delay spread) may be inferred from a periodic TRS. In some examples, other QCL relationships between PDSCH DMRS and periodic TRS, e.g. QCL typeB, QCL typeC, or even introducing a new QCL type that includes at least the Doppler shift property, are not precluded.

Figure 15:
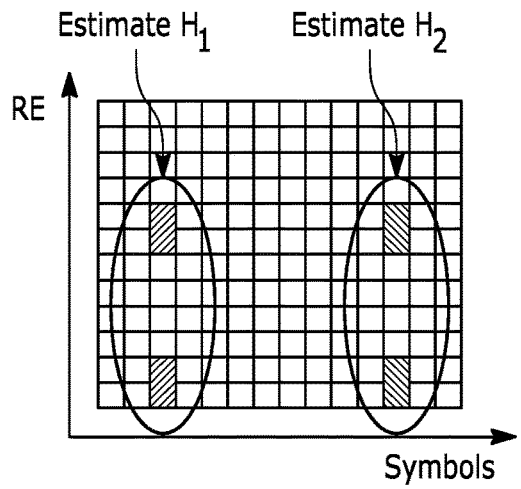
FIG. 15 is a resource map for an exemplary demodulation reference signal pattern including the relative mapping to both a first portion and a second portion of the demodulation reference signal for an exemplary front loaded demodulation reference signal with single symbol and one additional symbol.

The PDSCH DMRS is configured with single (double) symbol(s) and with one additional symbol (type 1 or type 2, Mapping type A or B), i.e. two(four) DMRS symbols in total within a slot (see FIG. 15, as an example). More specifically, FIG. 15 illustrates a resource map 1500 for an exemplary demodulation reference signal pattern including the relative mapping to both a first portion and a second portion of the demodulation reference signal for an exemplary front loaded demodulation reference signal with single symbol and one additional symbol. With two periodic TRSs configured, the UE uses the first (first pair) DMRS symbol(s) to estimate the channel from RRH1, denoted by $H_1$, assuming it is QCL'ed with the first TRS. The UE uses the second (second pair) DMRS symbol(s) to estimate the channel from RRH2, denoted as $H_2$, assuming it is QCLed with the second TRS. In this scenario, the network transmits the codeword x over the channel $H_1+H_2$, i.e. the UE receives $(H_1+H_2)*x$ while estimating $H_1$ and $H_2$ independently.

Figure 16:
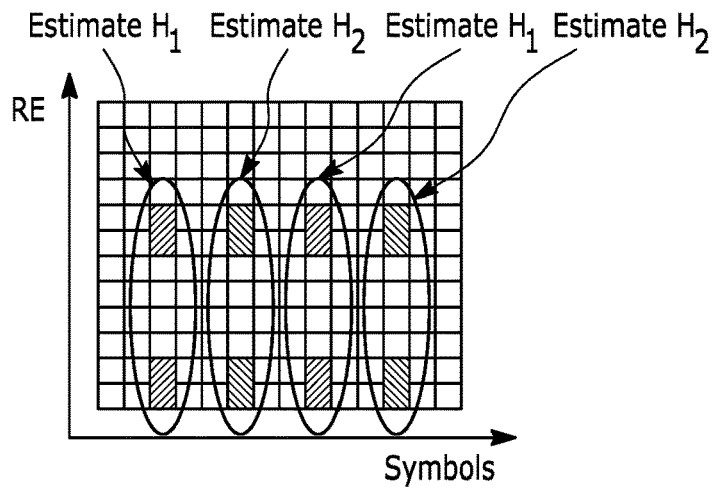
FIG. 16 is a resource map for an exemplary demodulation reference signal pattern including the relative mapping to both a first portion and a second portion of the demodulation reference signal for an exemplary front loaded demodulation reference signal with single symbol and three additional symbol.

In another embodiment, the PDSCH DMRS is configured with single symbol and with three additional symbols (type 1 or type 2), i.e. four DMRS symbols in total within a slot (see FIG. 16, as an example). More specifically, FIG. 16 illustrates a resource map 1600 for an exemplary demodulation reference signal pattern including the relative mapping to both a first portion and a second portion of the demodulation reference signal for an exemplary front loaded demodulation reference signal with single symbol and three additional symbol. With two periodic TRSs configured, the UE uses the first and third DMRS symbols to estimate the channel from RRH1, denoted by $H_1$, assuming it is QCL'ed with the first TRS. The UE uses the second and fourth DMRS symbols to estimate the channel from RRH2, denoted as $H_2$, assuming it is QCLed with the second TRS. In this scenario, the network transmits the codeword x over the channel $H_1+H_2$, i.e. the UE receives $(H_1+H_2)*x$ while estimating $H_1$ and $H_2$ independently.

Figure 17:
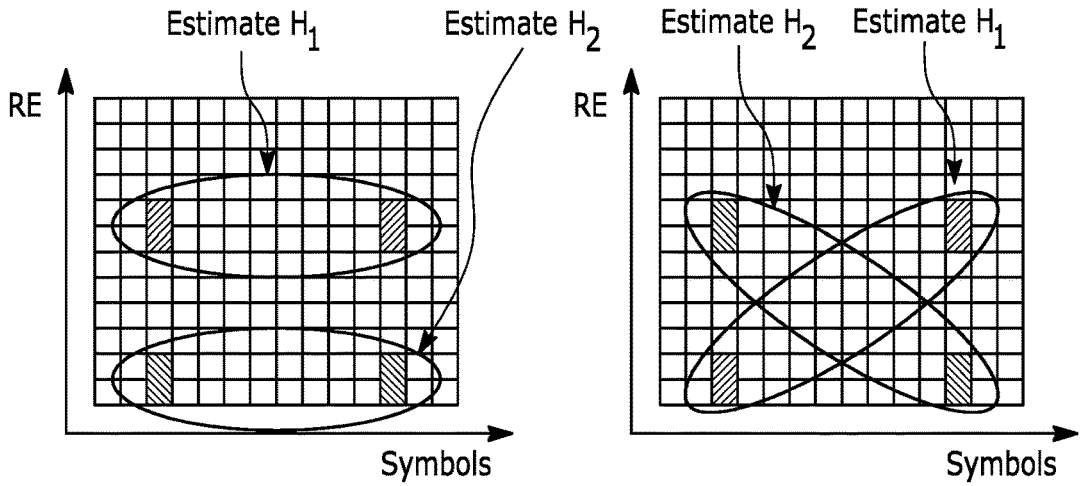
FIG. 17 is a pair of resource maps corresponding to a pair of exemplary demodulation reference signal patterns including the relative mapping to both a first portion and a second portion of the demodulation reference signal each using demodulation reference signal resource elements from different demodulation reference signal symbols.

In another embodiment, the PDSCH DMRS is configured with single (double) symbol and with one additional symbol (type 1 or type 2), i.e. two (four) DMRS symbols in total within a slot (see FIG. 17). More specifically, FIG. 17 is a pair of resource maps 1700 corresponding to a pair of exemplary demodulation reference signal patterns including the relative mapping to both a first portion and a second portion of the demodulation reference signal each using demodulation reference signal resource elements from different demodulation reference signal symbols. The UE receives a downlink scheduling DCI, indicating DMRS ports from one CDM group, and a two TCI state codepoint. The two TCI states have the two TRSs as their source RSs. With two periodic TRSs configured, the UE uses half of the REs of the first (first two) DMRS symbol(s) and half of the REs of the second (second two) DMRS symbol(s) (see FIG. 17) to estimate the channel from RRH1, denoted by $H_1$, assuming it is QCL'ed with the first TRS. This would improve performance for high Doppler spreads with small coherence time especially for low subcarrier spacing. The UE uses the second half of the REs of the first (first two) DMRS symbol(s) and the second half of the REs of the second DMRS (second two) symbol(s) to estimate the channel from RRH2, denoted by $H_2$, assuming it is QCL'ed with the second TRS. In this scenario, the network transmits the codeword x over the channel $H_1+H_2$, i.e. the UE receives $(H_1+H_2)*x$ while estimating $H_1$ and $H_2$ independently.

Figure 18:
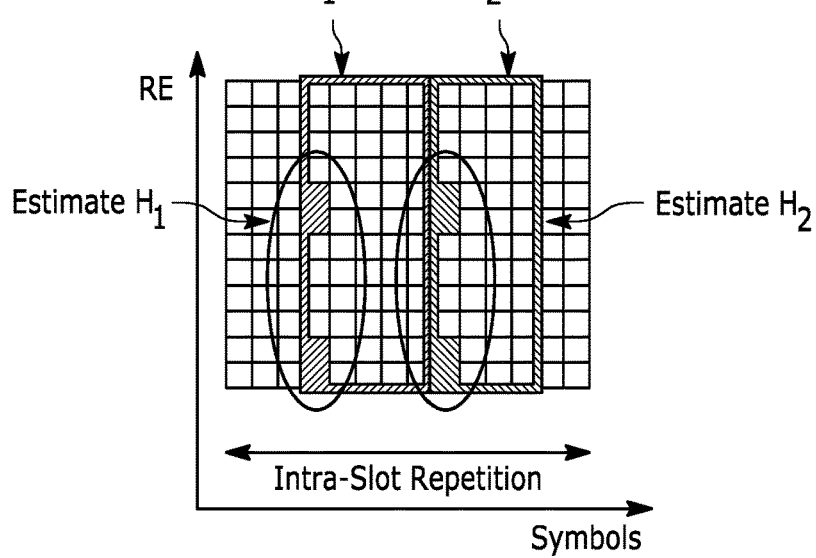
FIG. 18 is a resource map for an exemplary demodulation reference signal pattern including the relative mapping to two mini-slot based repetition occasions within a particular slot.

In another embodiment, the UE is configured with higher layer parameter RepSchemeEnabler="TDMSchemeA", where it enables the UE, semi-statically, to support single DCI two PDSCH repetition (e.g., two mini-slot based repetitions of the PDSCH within a slot). The UE is configured with two TRSs, establishing fine time/frequency synchronization with respect to RRH1 and RRH2 respectively. The UE receives a downlink scheduling DCI, and a two TCI state codepoint, with one redundancy version. The two TCI states have the two TRSs as their source RSs. The UE uses the DMRS symbol in PDSCH 1/PDSCH transmission occasion 1 (see FIG. 18) to estimate the channel from RRH1, denoted by $H_1$, assuming it is QCL'ed with the first TRS. More specifically, FIG. 18 illustrates a resource map 1800 for an exemplary demodulation reference signal pattern including the relative mapping to two mini-slot based repetition occasions within a particular slot. The UE the DMRS symbol in PDSCH 2/PDSCH transmission occasion 2 to estimate the channel from RRH2, denoted by $H_2$, assuming it is QCL'ed with the second TRS. In this scenario, the network transmits $(H_1)*x$ on PDSCH 1 and $(H_2)*x$ on PDSCH 2. The UE then decodes $(H_1+H_2)*x$ while estimating $H_1$ and $H_2$ independently.

In some examples, the DCI may indicate more than two PDSCH repetitions. The PDSCH repetitions may span more than one slot. A PDSCH repetition may be confined to within a slot or multiple slots and may span across a slot boundary.

Figure 19:
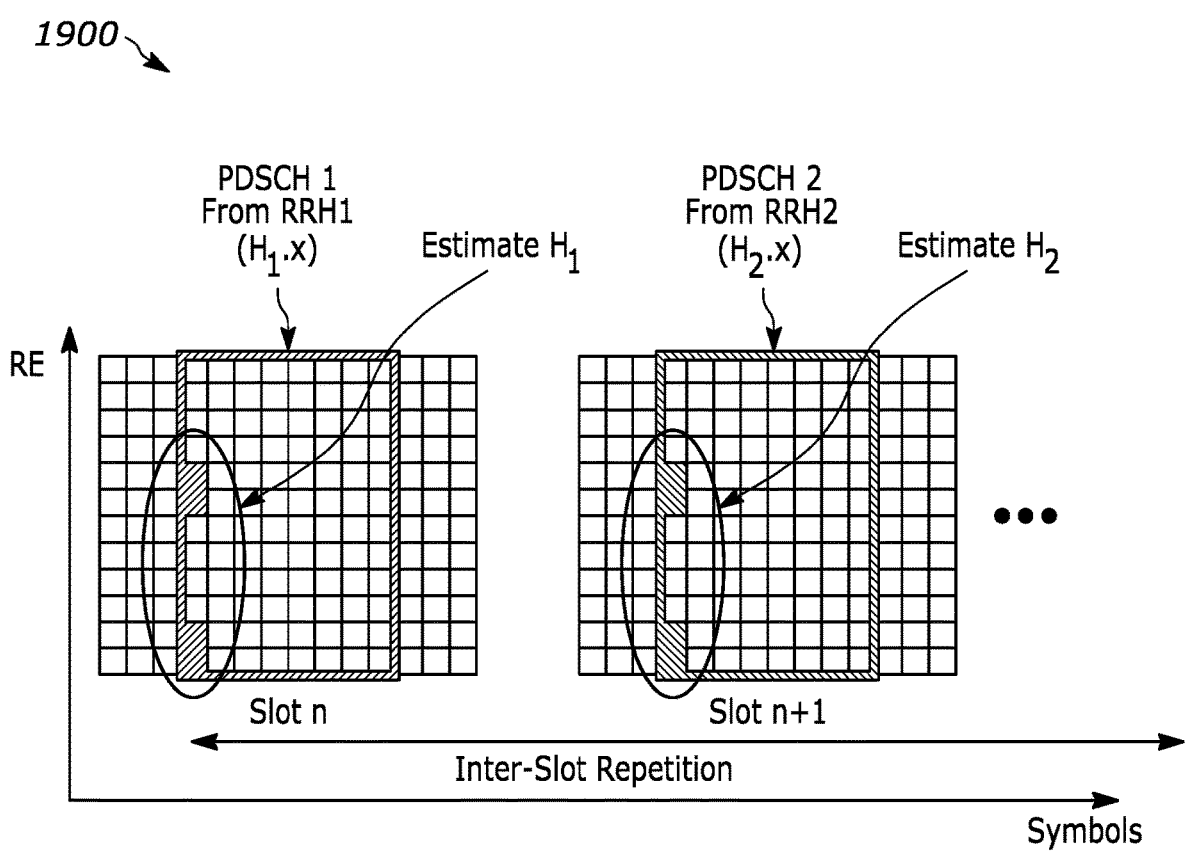
FIG. 19 is a resource map for an exemplary demodulation reference signal pattern including a mapping that includes multiple repetition occasions respectively associated with each one of multiple slots.

In another embodiment, the UE is configured by the higher layer parameter PDSCH-config that indicates at least one entry in pdsch-TimeDomainAllocationList containing RepNumR16 in PDSCH-TimeDomainResourceAllocation. The UE receives a downlink scheduling DCI with two TCI states in a codepoint of the DCI field 'Transmission Configuration Indication' together with the DCI field "Time domain resource assignment' indicating an entry in pdsch-TimeDomainAllocationList which contain RepNum16 in PDSCH-TimeDomainResourceAllocation and DM-RS port(s) within one CDM group in the DCI field "Antenna Port(s)". Candidate values of RepNumR16={2, 3, 4, 5, 6, 7, 8, 16}. The downlink scheduling DCI is a single DCI indicating multi PDSCH repetitions across slots (see FIG. 19). More specifically, FIG. 19 illustrates a resource map 1900 for an exemplary demodulation reference signal pattern including a mapping that includes multiple repetition occasions respectively associated with each one of multiple slots. The downlink scheduling DCI indicates a two TCI state codepoint and a single RV. The two TCI states have the two TRSs as their source RSs. Considering RepNumR16=2, the UE uses the DMRS symbol in PDSCH 1/PDSCH transmission occasion 1 (see FIG. 18) to estimate the channel from RRH1, denoted by $H_1$, assuming it is QCL'ed with the first TRS. The UE the DMRS symbol in PDSCH 2/PDSCH transmission occasion 2 to estimate the channel from RRH2, denoted by $H_2$, assuming it is QCL'ed with the second TRS. In this scenario, the network transmits $(H_1)*x$ on PDSCH 1 and $(H_2)*x$ on PDSCH 2. The UE then decodes $(H_1+H_2)*x$ while estimating $H_1$ and $H_2$ independently.

In some of embodiments, the transmissions from RRH1 and RRH2 may be precoded independently i.e., the precoders may be different. In some examples, the DMRS is precoded using the same precoder as that used for a PDSCH transmission. In some examples, the precoder is determined based on CSI feedback from the UE. The CSI feedback may comprise CSI for RRH1, CSI for RRH2 or both.

Antenna Panel, Antenna Port, Quasi-Colocation, TCI State, and Spatial Relation

In some embodiments, the terms antenna, panel, and antenna panel are used interchangeably. An antenna panel may be a hardware that is used for transmitting and/or receiving radio signals at frequencies lower than 6 GHz, e.g., frequency range 1 (FR1), or higher than 6 GHz, e.g., frequency range 2 (FR2) or millimeter wave (mmWave). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a radio frequency (RF) chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device (e.g., UE, node) antenna panel may be a physical or logical antenna array comprising a set of antenna elements or antenna ports that share a common or a significant portion of an RF chain (e.g., in-phase/quadrature (I/Q) modulator, analog to digital (A/D) converter, local oscillator, phase shift network). The device antenna panel or "device panel" may be a logical entity with physical device antennas mapped to the logical entity. The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier (LNA) power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its Tx beam independently, Unit of antenna group to control its transmission power independently, Unit of antenna group to control its transmission timing independently. The "device panel" may be transparent to gNB. For certain condition(s), gNB or network can assume the mapping between device's physical antennas to the logical entity "device panel" may not be changed. For example, the condition may include until the next update or report from device or comprise a duration of time over which the gNB assumes there will be no change to the mapping. A device may report its capability with respect to the "device panel" to the gNB or network. The device capability may include at least the number of "device panels". In one implementation, the device may support UL transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed.

Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties and different subset of large-scale properties may be indicated by a QCL Type. For example, qcl-Type may take one of the following values:
'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}.

Spatial Rx parameters may include one or more of: angle of arrival (AoA,) Dominant AoA, average AoA, angular spread, Power Angular Spectrum (PAS) of AoA, average AoD (angle of departure), PAS of AoD, transmit/receive channel correlation, transmit/receive beamforming, spatial channel correlation etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity (CDD). The procedure used to derive antenna ports from physical antennas may be specific to a device implementation and transparent to other devices.

In some of the embodiments described, a TCI-state associated with a target transmission can indicate parameters for configuring a quasi-co-location relationship between the target transmission (e.g., target RS of DMRS ports of the target transmission during a transmission occasion) and a source reference signal(s) (e.g., SSB/CSI-RS/SRS) with respect to quasi co-location type parameter(s) indicated in the corresponding TCI state. A device can receive a configuration of a plurality of transmission configuration indicator states for a serving cell for transmissions on the serving cell.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the reference RS (e.g., DL RS such as SSB/CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

In release 15, the scheduling downlink grant can indicate only one TCI state. Therefore, for high speed train scenario receiving the same packet from two RRHs, the PDSCH DMRS can be QCL'ed with one TRS, and the difference in Doppler shifts for the channel to RRH1 versus RRH2, would cause intercarrier interference, degrade channel estimation quality, and hence decrease performance.

In release 16, multi-TRP non-coherent joint transmission (NCJT) and URLLC schemes enable a two TCI state indication in the TCI codepoint in the scheduling DCI. However, NCJT schemes are designed to increase spectral efficiency, and URLLC schemes are designed to increase reliability.

In HST scenarios, where power gain may be needed to increase coverage, to improve performance and to reduce handoffs, this is not supported in release 16. This enables the UE:

To use a TRS from every RRH for fine frequency synchronization;
Estimate the channels from RRH1 and RRH2 separately;
Achieve a power gain from sending the same data from the two RRHs simultaneously.

Figure 20:
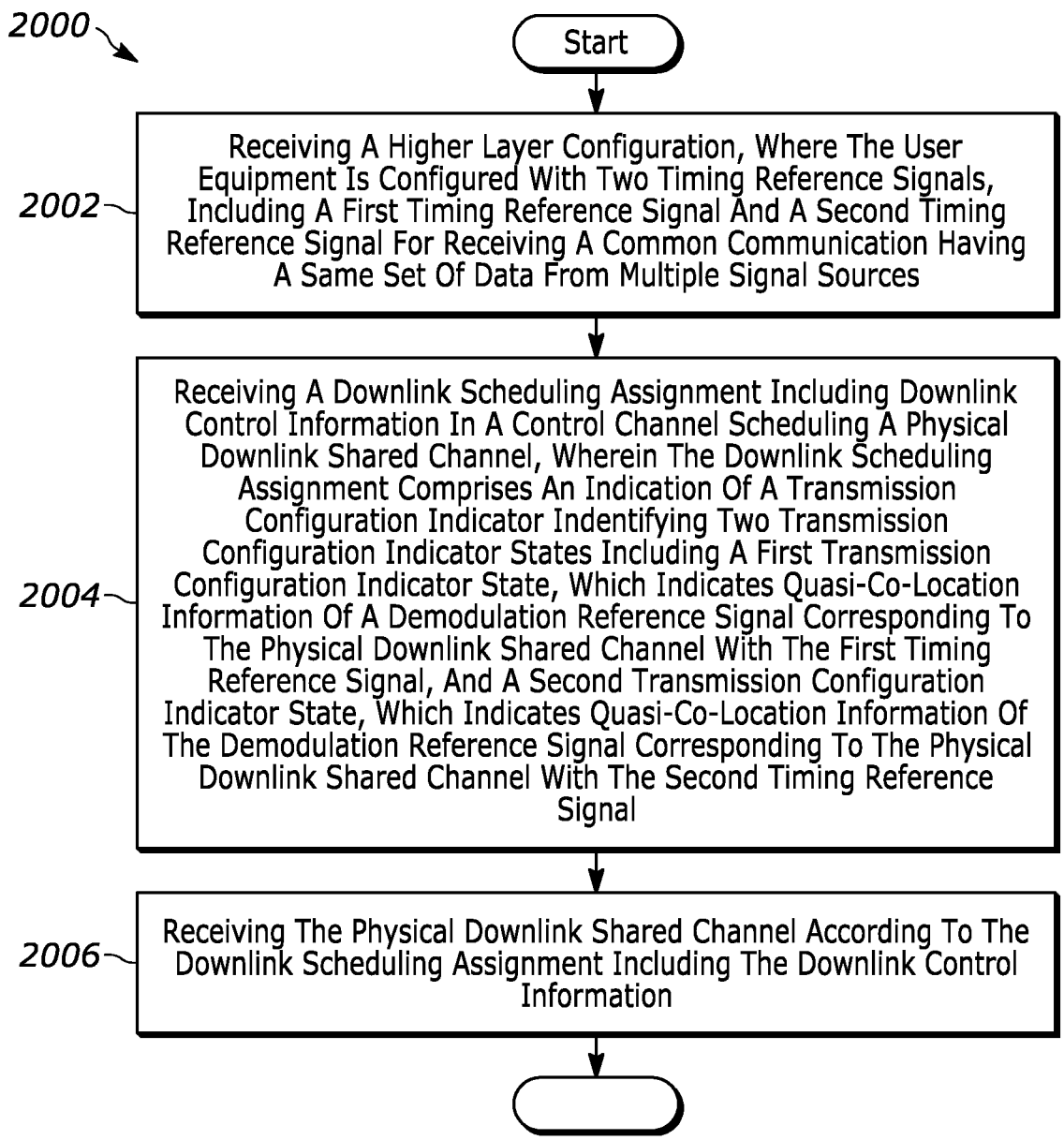
FIG. 20 is a flow diagram in a user equipment associated with identifying multiple timing reference signals for receiving a common communication from multiple signal sources.

FIG. 20 illustrates a flow diagram 2000 in a user equipment associated with identifying multiple timing reference signals for receiving a common communication from multiple signal sources. In accordance with at least one embodiment, the method can include receiving 2002 a higher layer configuration, where the user equipment is configured with two timing reference signals, including a first timing reference signal and a second timing reference signal for receiving a common communication having a same set of data from multiple signal sources. A downlink scheduling assignment including downlink control information is received 2004 in a control channel scheduling a physical downlink shared channel, wherein the downlink scheduling assignment comprises an indication of a transmission configuration indicator identifying two transmission configuration indicator states including a first transmission configuration indicator state, which indicates quasi-co-location information of a demodulation reference signal corresponding to the physical downlink shared channel with the first timing reference signal, and a second transmission configuration indicator state, which indicates quasi-co-location information of the demodulation reference signal corresponding to the physical downlink shared channel with the second timing reference signal. The physical downlink shared channel is then received 2006 according to the downlink scheduling assignment including the downlink control information.

In some instances, the two transmission configuration indicator states can be indicated with one transmission configuration indicator codepoint in the downlink control information.

In some instances, the quasi-co-location information of the demodulation reference signal corresponding to the physical downlink shared channel with the first timing reference signal can be a 'typeA' quasi-co-location type, and the quasi-co-location information of the demodulation reference signal corresponding to the physical downlink shared channel with the second timing reference signal can be the 'typeA' quasi-co-location type, and wherein the 'typeA' quasi-co-location type can include Doppler shift, Doppler spread, average delay, and delay spread properties.

In some instances, the downlink scheduling assignment can further include an indication of one or more antenna ports, and an associated demodulation reference signal belonging to a same demodulation reference signal code division modulation group. A first portion of the demodulation reference signal and a second portion of the demodulation reference signal associated with the physical downlink shared channel can then be received, where the first portion of the demodulation reference signal including one or more symbols can be assumed to be quasi-co-located with the first timing reference signal, and the second portion of the demodulation reference signal including one or more symbols can be assumed to be quasi-co-located with the second timing reference signal, and where the first portion of the demodulation reference signal and the second portion of the demodulation reference signal do not occupy the same time-frequency resources. The physical downlink shared channel can then be received according to the downlink scheduling assignment including the downlink control information based on the symbols of the first portion of the demodulation reference signal received and the symbols of the second portion of the demodulation reference signal received.

In some of these instances, the demodulation reference signal can be organized based on a demodulation reference signal symbol index into one or more demodulation reference signal symbol groups, where each of the demodulation reference signal symbol groups can include one or more symbols. The first portion of the demodulation reference signal can correspond to a first one of the two demodulation reference signal symbol groups, and the second portion of the demodulation reference signal can correspond to a second one of the two demodulation reference signal symbol groups.

Alternatively, in some of these instances, the demodulation reference signal can be organized based on a demodulation reference signal resource element index into one or more demodulation reference signal resource element groups, where each of the demodulation reference signal resource element groups can include one or more resource elements. The first portion of the demodulation reference signal can correspond to a first one of the two demodulation reference signal resource element groups, and the second portion of the demodulation reference signal can correspond to a second one of the two demodulation reference signal resource element groups.

In some instances, the demodulation reference signal can be organized based on a demodulation reference signal symbol index into one or more demodulation reference signal symbol groups, where each of the demodulation reference signal symbol groups can include one or more symbols, and the demodulation reference signal can be organized based on a demodulation reference signal resource element index into one or more demodulation reference signal resource element groups, where each of the demodulation reference signal resource element groups can include one or more resource elements. The first portion of the demodulation reference signal can correspond to a first one of the two demodulation reference signal symbol groups and a second one of the two demodulation reference signal resource element groups, and the second portion of the demodulation reference signal can correspond to a second one of the two demodulation reference signal symbol groups and a first one of the two demodulation reference signal resource element groups.

In some instances, the downlink control information of the downlink scheduling assignment can indicate two minislot based repetition occasions of the physical downlink shared channel within a slot with one redundancy version. The first portion of the demodulation reference signal can include a first set of demodulation reference signal symbols in a first physical downlink shared channel transmission occasion of the two physical downlink shared channel mini-slot based repetition occasions, and the second portion of the demodulation reference signal can includes a second set of demodulation reference signal symbols in a second physical downlink shared channel transmission occasion of the two physical downlink shared channel mini-slot based repetition occasions.

In some instances, the downlink control information of the downlink scheduling assignment can include an indication identifying a number of transmission occasions of the physical downlink shared channel respectively associated with each one of multiple slots. The first portion of the demodulation reference signal can include a first set of demodulation reference signal symbols in a first grouping of the physical downlink shared channel transmission occasions, and the second portion of the demodulation reference signal can include a second set of demodulation reference signal symbols in a second grouping of the physical downlink shared channel transmission occasions.

In some of these instances, the first grouping of the physical downlink shared transmission occasions can correspond to a first half of the physical downlink shared transmission occasions, and the second grouping of the physical downlink shared transmission occasions can correspond to a second half of the physical downlink shared transmission occasions.

In some instances, each of the first and the second timing reference signal can be a non-zero power channel state information reference signal resource set, which can be configured with a higher layer parameter that configures timing reference signal information.

In some instances, the scheduling downlink configuration information can indicate a single codeword and a single redundancy version for the physical downlink shared channel.

In some instances, a number of ports of the demodulation reference signal can be the same as a number of layers of the physical downlink shared channel transmission.

In some instances, can further include determining two Doppler shift values, wherein a first one of the two Doppler shift values can be based on the first timing reference signal, and wherein a second one of the two Doppler shift values can be based on the second timing reference signal.

Figure 21:
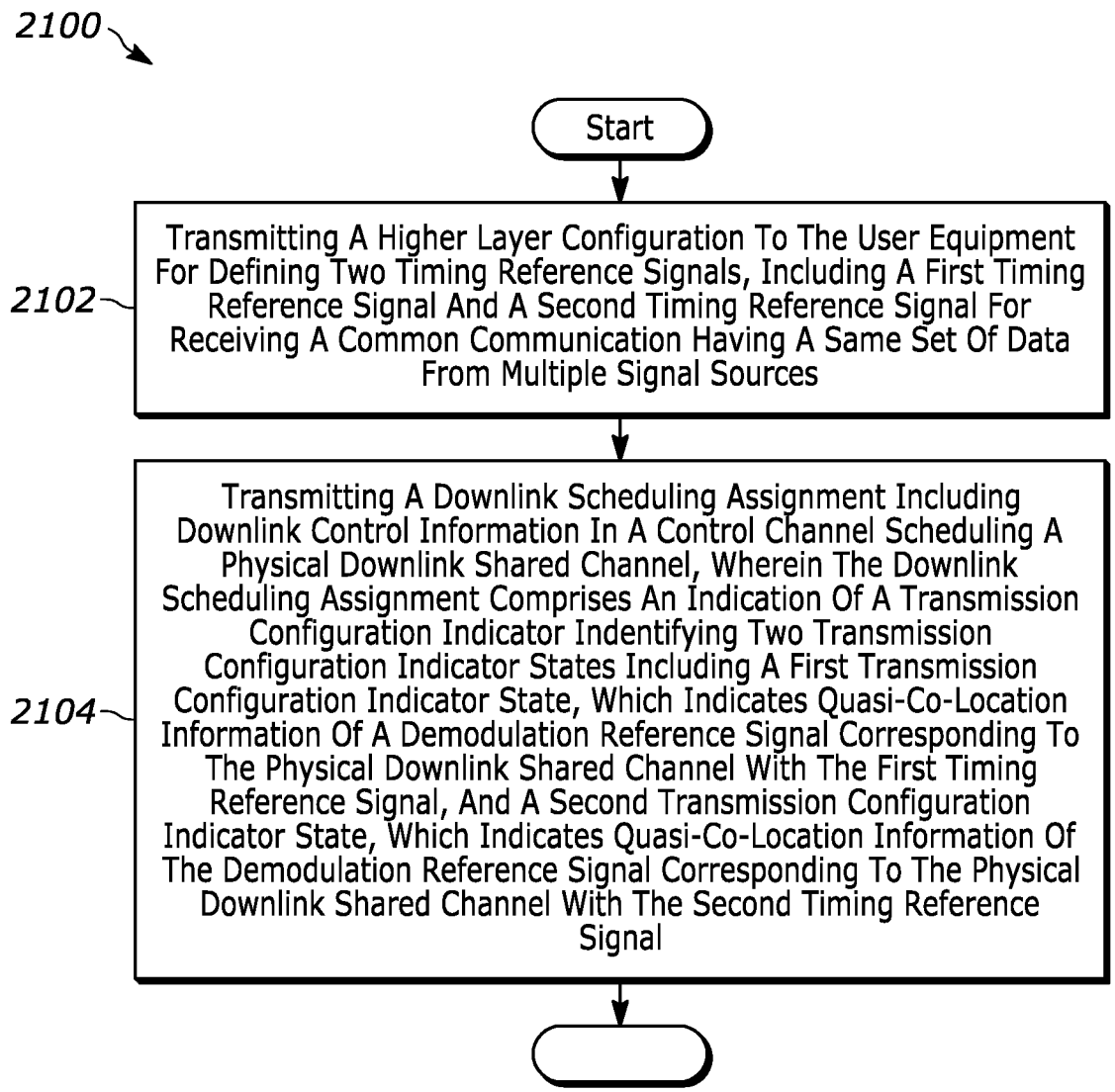
FIG. 21 is a flow diagram in a network entity, associated with transmitting configuration information associated with identifying multiple timing reference signals respectively associated with multiple signal sources that are transmitting a common communication.

FIG. 21 illustrates a flow diagram 2100 in a network entity, associated with transmitting configuration information associated with identifying multiple timing reference signals respectively associated with multiple signal sources that are transmitting a common communication. In accordance with at least one embodiment, the method can include transmitting 2102 a higher layer configuration to the user equipment for defining two timing reference signals, including a first timing reference signal and a second timing reference signal for receiving a common communication having a same set of data from multiple signal sources. A downlink scheduling assignment including downlink control information can be transmitted 2104 in a control channel scheduling a physical downlink shared channel, wherein the downlink scheduling assignment can include an indication of a transmission configuration indicator identifying two transmission configuration indicator states including a first transmission configuration indicator state, which can indicate quasi-co-location information of a demodulation reference signal corresponding to the physical downlink shared channel with the first timing reference signal, and a second transmission configuration indicator state, which can indicate quasi-co-location information of the demodulation reference signal corresponding to the physical downlink shared channel with the second timing reference signal.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 22:
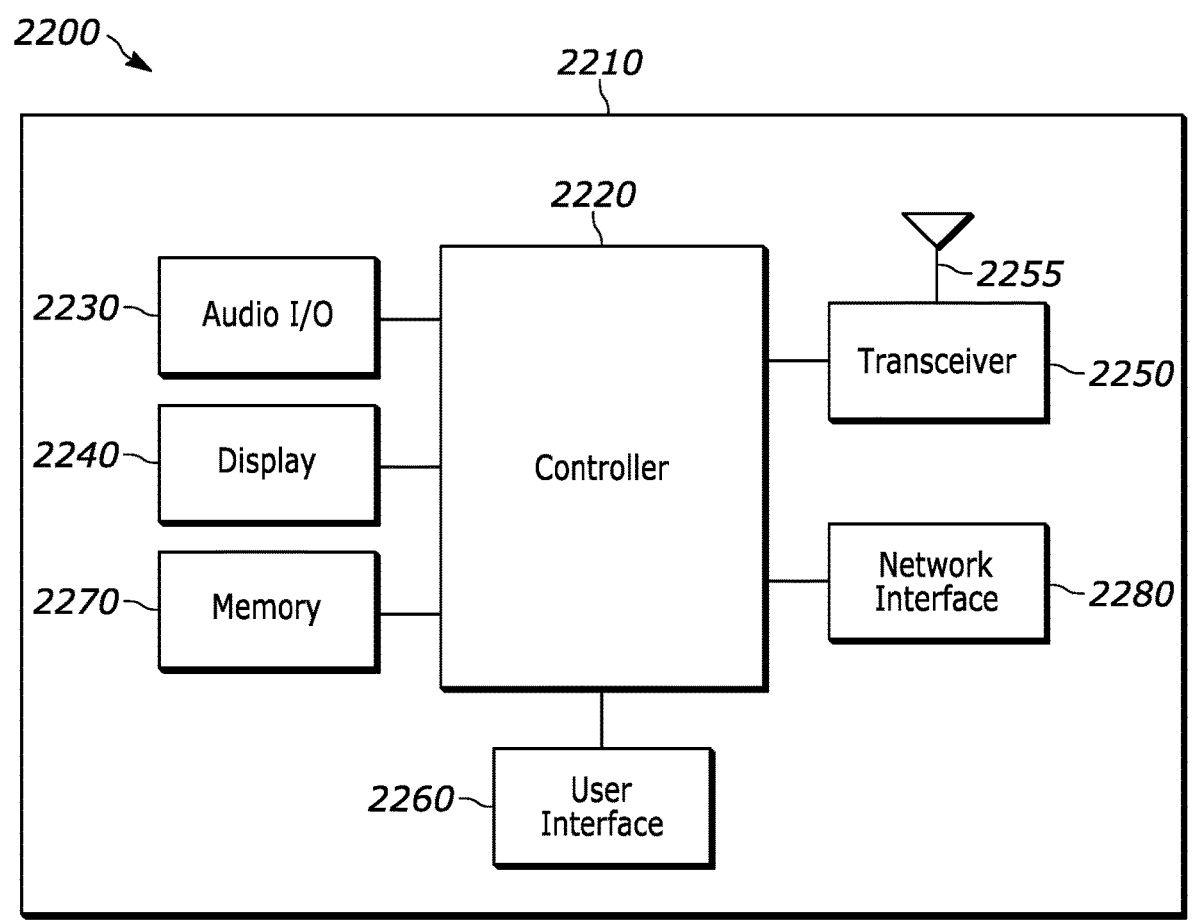
FIG. 22 is a block diagram of an exemplary apparatus according to a possible embodiment.

FIG. 22 is an example block diagram of an apparatus 2200, such as the wireless communication device 110, according to a possible embodiment. The apparatus 2200 can include a housing 2210, a controller 2220 within the housing 2210, audio input and output circuitry 2230 coupled to the controller 2220, a display 2240 coupled to the controller 2220, a transceiver 2250 coupled to the controller 2220, an antenna 2255 coupled to the transceiver 2250, a user interface 2260 coupled to the controller 2220, a memory 2270 coupled to the controller 2220, and a network interface 2280 coupled to the controller 2220. The apparatus 2200 can perform the methods described in all the embodiments.

The display 2240 can be a viewfinder, a liquid crystal display (LCD), a light emitting diode (LED) display, a plasma display, a projection display, a touch screen, or any other device that displays information. The transceiver 2250 can include a transmitter and/or a receiver. The audio input and output circuitry 2230 can include a microphone, a speaker, a transducer, or any other audio input and output circuitry. The user interface 2260 can include a keypad, a keyboard, buttons, a touch pad, a joystick, a touch screen display, another additional display, or any other device useful for providing an interface between a user and an electronic device. The network interface 2280 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 2270 can include a random access memory, a read only memory, an optical memory, a solid state memory, a flash memory, a removable memory, a hard drive, a cache, or any other memory that can be coupled to an apparatus.

The apparatus 2200 or the controller 2220 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 2270 or elsewhere on the apparatus 2200. The apparatus 2200 or the controller 2220 may also use hardware to implement disclosed operations. For example, the controller 2220 may be any programmable processor. Disclosed embodiments may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 2220 may be any controller or processor device or devices capable of operating an apparatus and implementing the disclosed embodiments. Some or all of the additional elements of the apparatus 2200 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method performed by a user equipment (UE), the method comprising:

receiving a higher layer configuration, wherein the UE is configured with two tracking reference signals (TRSs), including a first TRS and a second TRS for receiving a common communication having a same set of data from multiple signal sources;

receiving a downlink scheduling assignment including downlink control information (DCI) in a control channel scheduling a physical downlink shared channel (PDSCH), wherein the downlink scheduling assignment comprises an indication of a transmission configuration indicator (TCI) identifying two TCI states including a first TCI state, which indicates quasi-co-location (QCL) information of a demodulation reference signal (DMRS) corresponding to the PDSCH with the first TRS, and a second TCI state, which indicates QCL information of the DMRS corresponding to the PDSCH with the second TRS, and wherein each of the first and the second TRS corresponds to a non-zero power (NZP) channel state information reference signal (CSI-RS) resource set, which is configured with a higher layer parameter that configures TRS information;

wherein the QCL information of the DMRS corresponding to the PDSCH with the first TRS is a 'typeA' QCL type, and the QCL information of the DMRS corresponding to the PDSCH with the second TRS is the 'typeA' QCL type, and wherein the 'typeA' QCL type includes Doppler shift, Doppler spread, average delay, and delay spread properties; and receiving the PDSCH according to the downlink scheduling assignment including the DCI.

2. The method according to claim 1, wherein the two TCI states are indicated with one TCI codepoint in the DCI.

3. The method according to claim 1, wherein the downlink scheduling assignment further comprises an indication of one or more antenna ports, and an associated DMRS belonging to a same DMRS code division modulation group;

wherein a first portion of the DMRS and a second portion of the DMRS associated with the PDSCH are received, wherein the first portion of the DMRS including one or more symbols is assumed to be quasi-co-located with the first TRS, and the second portion of the DMRS including one or more symbols is assumed to be quasi-co-located with the second TRS, and wherein the first portion of the DMRS and the second portion of the DMRS do not occupy the same time-frequency resources; and wherein the PDSCH is received according to the downlink scheduling assignment including the DCI based on the symbols of the first portion of the DMRS received and the symbols of the second portion of the DMRS received.

4. The method according to claim 3, wherein the DMRS is organized based on a DMRS symbol index into one or more DMRS symbol groups, wherein each of the one or more DMRS symbol groups includes one or more symbols; and wherein the first portion of the DMRS corresponds to a first one of two DMRS symbol groups, and the second portion of the DMRS corresponds to a second one of the two DMRS symbol groups.

5. The method according to claim 3, wherein the DMRS is organized based on a DMRS resource element index into one or more DMRS resource element groups, wherein each of the one or more DMRS resource element groups includes one or more resource elements; and wherein the first portion of the DMRS corresponds to a first one of two DMRS resource element groups, and the second portion of the DMRS corresponds to a second one of the two DMRS resource element groups.

6. The method according to claim 3, wherein the DMRS is organized based on a DMRS symbol index into one or more DMRS symbol groups, wherein each of the one or more DMRS symbol groups includes one or more symbols, and the DMRS is organized based on a DMRS resource element index into one or more DMRS resource element groups, wherein each of the one or more DMRS resource element groups includes one or more resource elements; and wherein the first portion of the DMRS corresponds to a first one of two DMRS symbol groups and a second one of two DMRS resource element groups, and the second portion of the DMRS corresponds to a second one of the two DMRS symbol groups and a first one of the two DMRS resource element groups.

7. The method according to claim 3, wherein the DCI of the downlink scheduling assignment indicates two mini-slot based repetition occasions of the PDSCH within a slot with one redundancy version; and wherein the first portion of the DMRS comprises a first set of DMRS symbols in a first PDSCH transmission occasion of the two mini-slot based repetition occasions of the PDSCH, and the second portion of the DMRS comprises a second set of DMRS symbols in a second PDSCH transmission occasion of the two mini-slot based repetition occasions of the PDSCH.

8. The method according to claim 3, wherein the DCI of the downlink scheduling assignment includes an indication identifying a number of PDSCH transmission occasions respectively associated with each one of multiple slots; and wherein the first portion of the DMRS comprises a first set of DMRS symbols in a first grouping of the PDSCH transmission occasions, and the second portion of the DMRS comprises a second set of DMRS symbols in a second grouping of the PDSCH transmission occasions.

9. The method according to claim 8, wherein the first grouping of the PDSCH transmission occasions corresponds to a first half of the PDSCH transmission occasions, and the second grouping of the PDSCH transmission occasions corresponds to a second half of the PDSCH transmission occasions.

10. The method according to claim 1, wherein the DCI indicates a single codeword and a single redundancy version for the PDSCH.

11. The method according to claim 1, wherein a number of ports of the DMRS is the same as a number of layers of the PDSCH transmission.

12. The method according to claim 1 further comprising determining two Doppler shift values, wherein a first one of the two Doppler shift values is based on the first TRS, and wherein a second one of the two Doppler shift values is based on the second TRS.

13. A user equipment (UE) for wireless communication comprising:
at least one memory; and
at least one processor coupled with the at least one memory and configured to cause the UE to:
receive a higher layer configuration, wherein the UE is configured with two tracking reference signals (TRSs), including a first TRS and a second TRS for receiving a common communication having a same set of data from multiple signal sources;
receive a downlink scheduling assignment including downlink control information (DCI) in a control channel scheduling a physical downlink shared channel (PDSCH), wherein the downlink scheduling assignment comprises an indication of a transmission configuration indicator (TCI) identifying two TCI states including a first TCI state, which indicates quasi-co-location (QCL) information of a demodulation reference signal (DMRS) corresponding to the PDSCH with the first TRS, and a second TCI state, which indicates QCL information of the DMRS corresponding to the PDSCH with the second TRS, and wherein each of the first and the second TRS corresponds to a non-zero power (NZP) channel state information reference signal (CSI-RS) resource set, which is configured with a higher layer parameter that configures TRS information;
wherein the QCL information of the DMRS corresponding to the PDSCH with the first TRS is a 'typeA' QCL type, and the QCL information of the DMRS corresponding to the PDSCH with the second TRS is the 'typeA' QCL type, and wherein the 'typeA' QCL type includes Doppler shift, Doppler spread, average delay, and delay spread properties; and
receive the PDSCH according to the downlink scheduling assignment including the DCI.

14. The UE according to claim 13, wherein the downlink scheduling assignment further comprises an indication of one or more antenna ports, and an associated DMRS belonging to a same DMRS code division modulation group;
wherein a first portion of the DMRS and a second portion of the DMRS associated with the PDSCH are received, wherein the first portion of the DMRS including one or more symbols is assumed to be quasi-co-located with the first TRS, and the second portion of the DMRS including one or more symbols is assumed to be quasi-co-located with the second TRS, and wherein the first portion of the DMRS and the second portion of the DMRS do not occupy the same time-frequency resources; and
wherein the PDSCH is received according to the downlink scheduling assignment including the DCI based on symbols of the first portion of the DMRS received and symbols of the second portion of the DMRS received.

15. The UE according to claim 14, wherein the DMRS is organized based on a DMRS symbol index into one or more DMRS symbol groups, wherein each of the one or more DMRS symbol groups includes one or more symbols; and
wherein the first portion of the DMRS corresponds to a first one of two DMRS symbol groups, and the second portion of the DMRS corresponds to a second one of the two DMRS symbol groups.

16. The UE according to claim 14, wherein the DMRS is organized based on a DMRS resource element index into one or more DMRS resource element groups, wherein each of the one or more DMRS resource element groups includes one or more resource elements; and
wherein the first portion of the DMRS corresponds to a first one of two DMRS resource element groups, and the second portion of the DMRS corresponds to a second one of the two DMRS resource element groups.

17. The UE according to claim 14, wherein the DMRS is organized based on a DMRS symbol index into one or more DMRS symbol groups, wherein each of the one or more DMRS symbol groups includes one or more symbols, and the DMRS is organized based on a DMRS resource element index into one or more DMRS resource element groups, wherein each of the one or more DMRS resource element groups includes one or more resource elements; and
wherein the first portion of the DMRS corresponds to a first one of two DMRS symbol groups and a second one of two DMRS resource element groups, and the second portion of the DMRS corresponds to a second one of the two DMRS symbol groups and a first one of the two DMRS resource element groups.

18. The UE according to claim 13, wherein a number of ports of the DMRS is the same as a number of layers of the PDSCH transmission.

19. The UE according to claim 13, wherein the two TCI states are indicated with one TCI codepoint in the DCI.

20. A processor for wireless communication, comprising:
at least one controller coupled with at least one memory and configured to cause the processor to:
receive a higher layer configuration, wherein the processor is configured with two tracking reference signals (TRSs), including a first TRS and a second TRS for receiving a common communication having a same set of data from multiple signal sources;

receive a downlink scheduling assignment including downlink control information (DCI) in a control channel scheduling a physical downlink shared channel (PDSCH), wherein the downlink scheduling assignment comprises an indication of a transmission configuration indicator (TCI) identifying two TCI states including a first TCI state, which indicates quasi-co-location (QCL) information of a demodulation reference signal (DMRS) corresponding to the PDSCH with the first TRS, and a second TCI state, which indicates QCL information of the DMRS corresponding to the PDSCH with the second TRS, and wherein each of the first and the second TRS corresponds to a non-zero power (NZP) channel state information reference signal (CSI-RS) resource set, which is configured with a higher layer parameter that configures TRS information;

wherein the QCL information of the DMRS corresponding to the PDSCH with the first TRS is a 'typeA' QCL type, and the QCL information of the DMRS corresponding to the PDSCH with the second TRS is the 'typeA' QCL type, and wherein the 'typeA' QCL type includes Doppler shift, Doppler spread, average delay, and delay spread properties; and receive the PDSCH according to the downlink scheduling assignment including the DCI.

* * * * *